United States Patent

Nishimura et al.

[11] Patent Number: 6,116,208
[45] Date of Patent: Sep. 12, 2000

[54] CONTROL SYSTEM FOR A DIRECT INJECTION-SPARK IGNITION ENGINE

[75] Inventors: Hirofumi Nishimura; Youichi Kuji, both of Hiroshima, Japan

[73] Assignee: Mazda Motor Corporation, Hiroshima, Japan

[21] Appl. No.: 09/199,449

[22] Filed: Nov. 25, 1998

[30] Foreign Application Priority Data

Sep. 29, 1998 [JP] Japan ................................ 10-274627

[51] Int. Cl.$^7$ .......................... F02B 17/00; F02M 25/07; F01N 3/20
[52] U.S. Cl. ............................. 123/295; 60/278; 123/299
[58] Field of Search .................................. 123/295, 299, 123/300, 568.11, 568.21; 60/274, 278, 285

[56] References Cited

U.S. PATENT DOCUMENTS

| | | | |
|---|---|---|---|
| 5,473,887 | 12/1995 | Takeshima et al. | 60/285 X |
| 5,983,630 | 11/1999 | Kibe et al. | 123/300 X |
| 6,029,622 | 2/2000 | Kadota et al. | 123/295 |

FOREIGN PATENT DOCUMENTS 7-119507  5/1995  Japan .
7-217478  8/1995  Japan .

*Primary Examiner*—Tony M. Argenbright
*Attorney, Agent, or Firm*—Nixon Peabody LLP; Donald Studebaker

[57] ABSTRACT

An engine control system for a direct injection-spark ignition type of engine which is equipped with an exhaust system having a lean NOx conversion catalyst for lowering a NOx level of exhaust gas while the engine operates in a lean fuel charge zone controls the engine to make stratified charge combustion in a zone of partial engine loadings and homogeneous charge combustion in a zone other than said partial engine loading zone and, while the engine operates in a zone where enriched homogeneous charge combustion is made, divides a given amount of fuel into two parts and sprays them through early and late split injection in a intake stroke and admits exhaust gas partly into an intake air stream introduced into the intake system from the exhaust system while the early and late split injection are made. The split injection are caused such that a midpoint between points at which the early and late split injection are timed to start before a midpoint of a intake stroke.

23 Claims, 21 Drawing Sheets

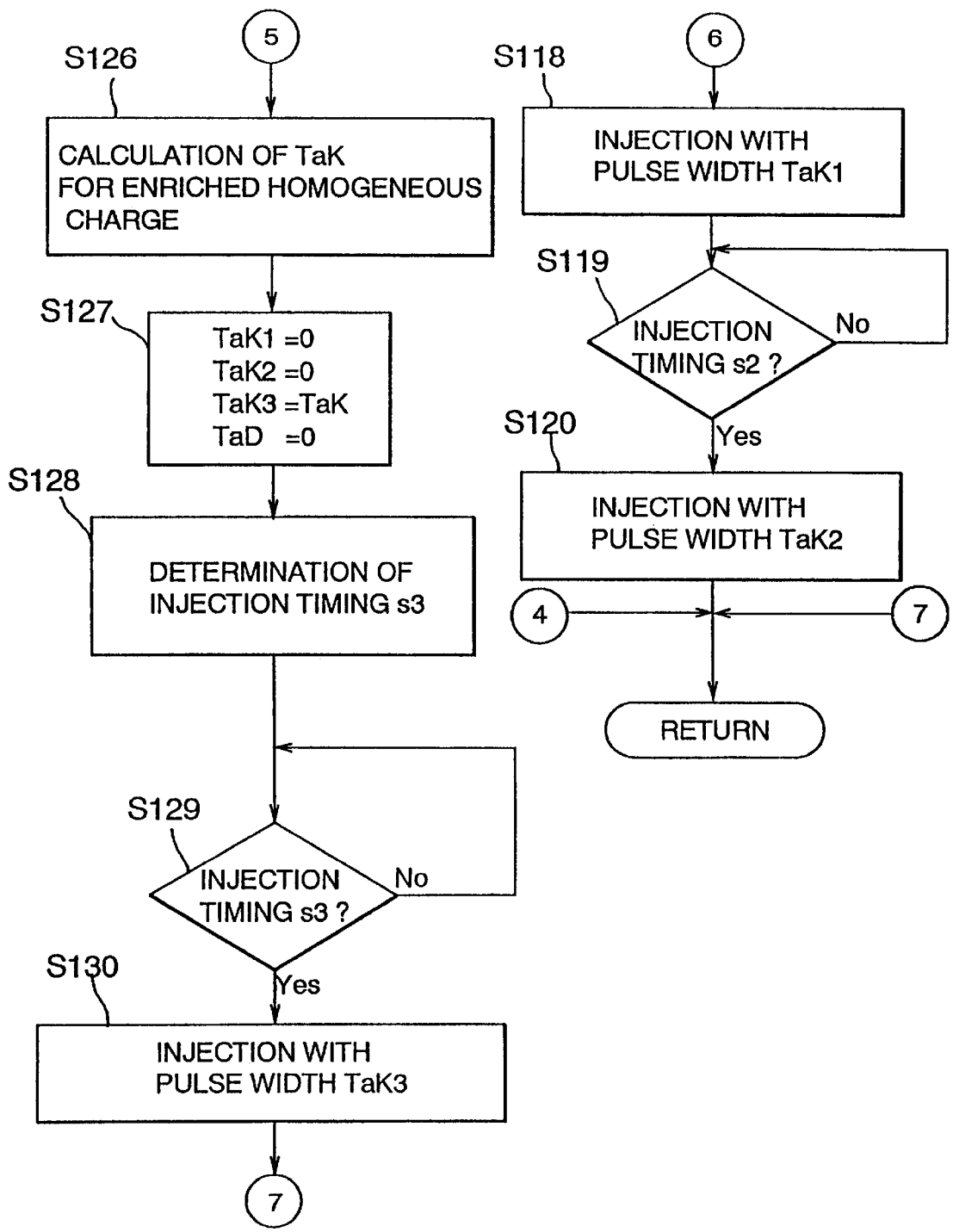

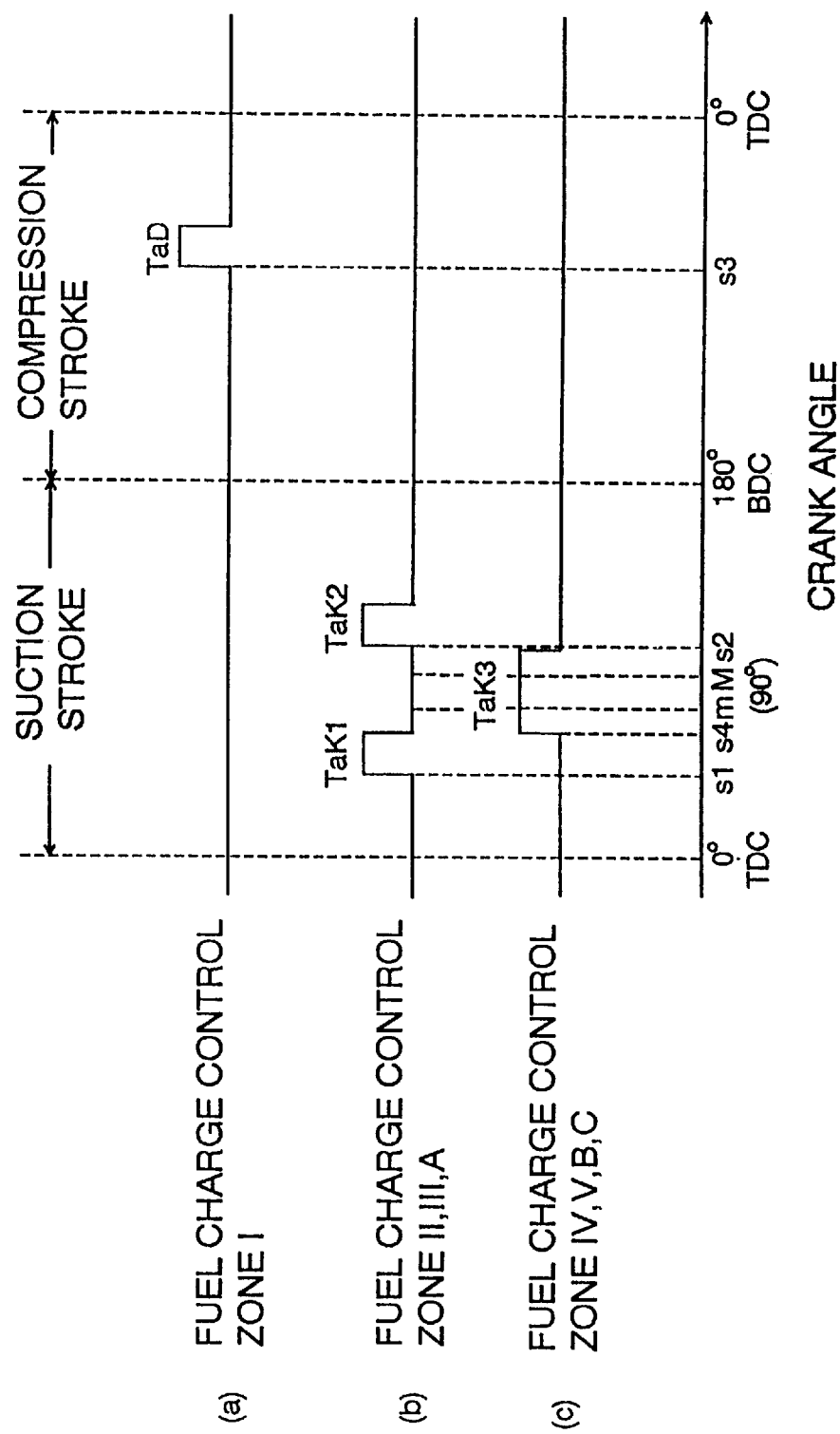

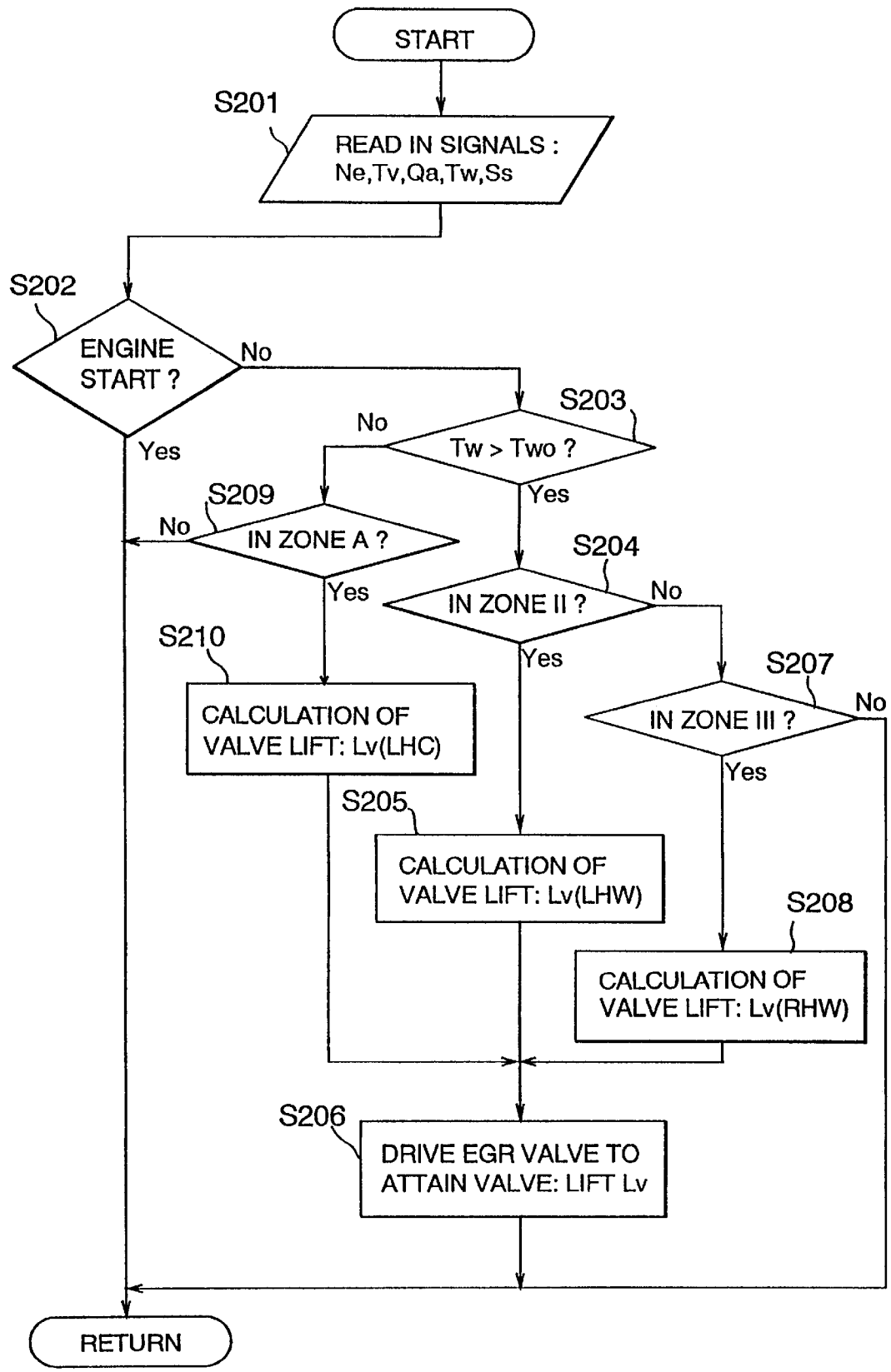

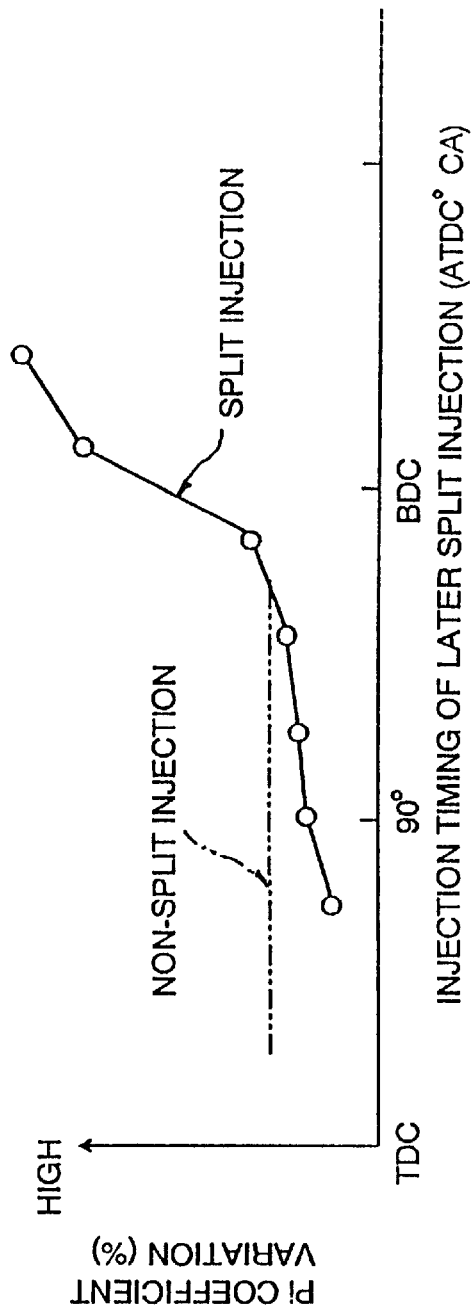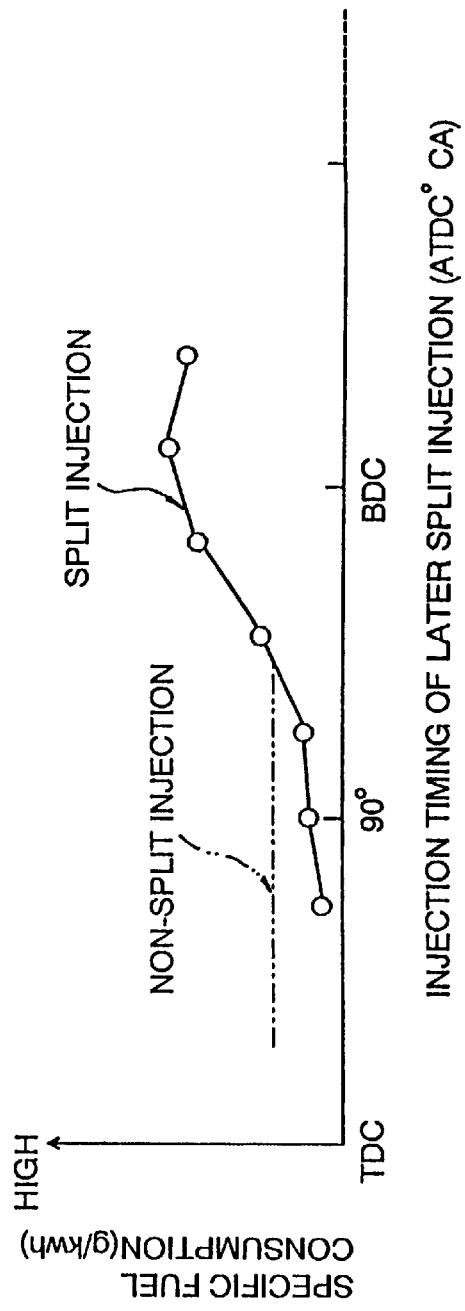
FIG. 8(A)
FIG. 8(B)

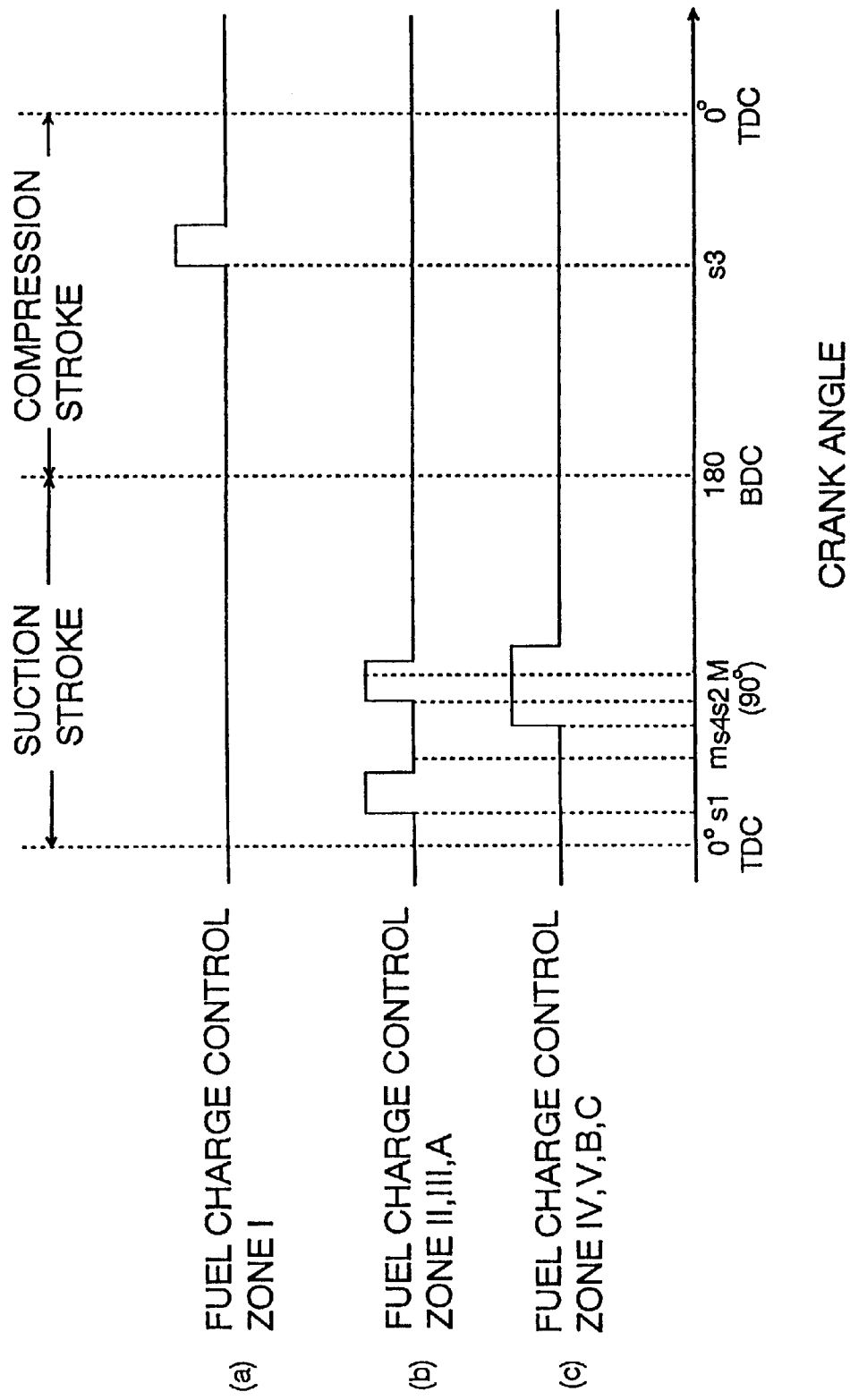

CONTROL SYSTEM FOR A DIRECT INJECTION-SPARK IGNITION ENGINE

BACKGROUND OF THE INVENTION

1. Field of the Invention

The invention relates to a control system for a direct injection-spark ignition type of engine equipped with an exhaust gas recirculation system, and, in particular, to a direct injection-spark ignition engine control system which has an exhaust system with a lean NOx catalyst for controlling an emission level of nitrogen oxides in exhaust gas produced as a result of combustion of a fuel mixture of $\lambda > 1$ and provides a stable nitrogen oxide reduction efficiency of the lean NOx conversion catalyst.

2. Description of the Related Art

Engine control system of this type incorporate in an exhaust line an NOx adsorption type of lean NOx conversion catalyst which, on one hand, adsorbs NOx in the exhaust gas while the air-fuel mixture is leaner than a stoichiometric mixture and, on the other hand, desorbs or releases the NOx into exhaust gas for catalyzing reduction of the NOx while the air-fuel mixture is richer than a stoichiometric mixture. As is known from, for example, International Patent Application WO93/07363, such an engine control system controls the engine to operate with an enriched mixture under accelerating conditions or full loading operating conditions and with a lean mixture under the remaining operating conditions, so as to improve specific fuel consumption.

An engine control system for a direct injection-spark ignition type of engine known from, for example, Japanese Unexamined Patent Publication 7-119507 controls the engine to cause stratified charge combustion in a lower engine loading zone and homogeneous charge combustion in a high engine loading zone. While the engine operates with lower speeds in the high loading zone, a given amount of fuel is delivered in two steps through early and late split injection in a intake stroke, so as to diffuse a first half of fuel sprayed through the early split injection in the combustion chamber before the end of a intake stroke and the second half of fuel in the combustion chamber with its volume increased, This prevents a generation of rich or dense mixture over the top of a piston in a subsequent compression stroke that generally occurs when a given amount of fuel is sprayed all at once through non-split injection, which is desirable to prevent generation of smoke.

Another engine control system for a direct injection-spark ignition engine cooperates with a fuel injector which is direct to face the top of a piston and energized to spray a small amount of fuel preparatorily at the beginning of a intake stroke when the engine causes knocking. The fuel partly sticks to the top wall of the piston on a side of an intake port and bounces off the piston wall toward the intake port to cool the piston head and the combustion chamber on the intake port side with the heat of vaporization of the fuel. Such an engine control system is known from, for example, Japanese Unexamined Patent Publication 7-217478.

An NOx adsorption type of lean NOx conversion catalyst described in the Japanese Unexamined Patent Publication 7-119507 causes aggravation of its catalytic conversion efficiency due to an increase in the amount of NOx adsorption when the engine continues lean charge combustion. The engine control system controls the engine to make enriched charge combustion to force the lean NOx conversion catalyst to desorb NOx and catalyzes reduction of NOx, so as thereby to refresh it with an effect of keeping stabilized catalytic conversion efficiency. Generally, emission levels of reducing hydrocarbons (HC) and reducing carbon monoxide (CO) into the exhaust gas are increased as a fuel mixture is enriched even more, desorption of NOx from the lean NOx conversion catalyst and reduction of the NOx progress within a short period of time. For that reason, the prior art engine control system controls the air-fuel ratio to significantly lower to approximately 12 to 13 so as to enrich a fuel mixture. Because, although the engine is operative with a lean mixture, an enriched fuel mixture is provided only for the purpose of refreshing the lean NOx conversion catalyst, the fuel efficiency is aggravated. Further, a fuel mixture is greatly enriched regardless of driver's intention, this is always accompanied by a great change in engine output which is unpleasant for the driver.

SUMMARY OF THE INVENTION

It is an objective of the invention to provide an engine control system for a direct injection-spark ignition type engine equipped with an exhaust system having a lean NOx conversion catalyst and an exhaust gas recirculation system which controls the engine to rise the concentration ratio of HC concentration to NOx concentration of exhaust gas so as thereby accelerating refreshment of the lean NOx conversion catalyst.

It is an other object of the invention to provide an engine control system for a direct injection-spark ignition type engine equipped with an exhaust system having a lean NOx conversion catalyst and an exhaust gas recirculation system which can enrich with an effect of preventing or significantly reducing aggravation of specific fuel consumption and shocks that the driver feels.

Extensive studies were undertaken by the inventors to review the refreshing action on various types of lean NOx conversion catalyst, including a NOx adsorption type of lean NOx conversion catalyst, the result of these studies brought it to light that the refreshing action on the lean NOx conversion catalyst is strongly affected not only by the hydrocarbon (HC) concentration and the carbon monoxide (CO) concentration of exhaust gas but rather by the nitrogen oxide (NOx) concentration of exhaust gas and that a ratio of the hydrocarbon (HC) concentration or the carbon monoxide (CO) concentration relative to the nitrogen oxide (NOx) concentration ((HC/NOx) or CO/NOx) is suitable as a quantitative parameter for the refreshing action.

The foregoing objects of the invention are accomplished by dividing a given amount of fuel into at least two parts and spraying them through multiply split injection, for example early and late split injection, in a intake stroke together with recirculating a large amount of exhaust gas into an intake air stream in a zone in which the engine is operated with an enriched charge, so as thereby to control or lower the amount of formation of nitrogen oxides (NOx).

According to an embodiment of the invention, the engine control system cooperates with a direct injection-spark ignition type of engine equipped with a fuel injector for spraying fuel directly into a combustion chamber of the engine and an exhaust system which has a lean NOx conversion catalyst for lowering an emission level of nitrogen oxides (NOx) at an air-fuel ratio of $\lambda > 1$ to control the engine to operate with a fuel charge of $\lambda > 1$ in a zone of partial engine loadings and with a fuel charge of $\lambda < 1$ in an enriched charge zone other than the partial engine loading zone. The engine control system comprises an exhaust gas recirculation means operative to recirculate exhaust gas partly into an intake air stream from the exhaust system and a fuel injection control means which, while the engine is monitored to be in the enriched charge zone, divides a given amount of fuel into at least two parts so as to cause the fuel injector to intermittently spray the two parts of fuel through at least two split injection in a intake stroke and causes the exhaust gas recirculation means to recirculate exhaust gas into an intake air stream from while the fuel injector sprays fuel through the split injection.

According to another embodiment of the invention, the engine control system cooperates with a direct injection-spark ignition type of engine equipped with a fuel injector for spraying fuel directly into a combustion chamber and an exhaust system which has a lean NOx conversion catalyst for lowering an emission level of nitrogen oxides (NOx) in exhaust gas at an air-fuel ratio of $\lambda>1$ to control the engine to perform stratified charge combustion in a zone of partial engine loadings and homogeneous charge combustion in a zone other than the partial engine loading zone. The engine control system comprises an exhaust gas recirculation means operative to recirculate exhaust gas partly into an intake system from the exhaust system and a fuel injection control means which, while the engine is monitored to be in a zone where the engine operates with an enriched homogeneous charge richer than a stoichiometric mixture, divides a given amount of fuel into two parts to spray them intermittently early and late split injection in a intake stroke and causes the exhaust gas recirculation means to recirculate exhaust gas into an intake air stream in the intake system while the early and late split injection are executed. The midpoint between points at which the early and late split injection are timed to start is before a midpoint of the intake stroke.

In the engine controlled by the engine control system of the invention, a first part of fuel sprayed through the early split injection is diffused sufficiently in the combustion chamber of which the volume is increased following down movement of the piston until the late split injection starts and another part of fuel sprayed through the late split injection is diffused in the combustion chamber of which the volume is even more increased, so that a homogeneous air fuel mixture is produced in the entire combustion chamber. In other words, the split injection provides a homogenious fuel distribution in the entire combustion chamber without enhancing penetrating force of a spray of fuel so strong.

The control in which fuel injection is made such that the midpoint between points at which the early and late split injection are timed to start is before the midpoint of a intake stroke provides various prominent effects described below. On condition that a given amount of fuel has to be injected within an entire intake stroke, the early split injection can be timed to start at a point at which the piston moves down at a relatively high speed, generating a strong intake air stream by which accomplishment of a homogeneous distribution of fuel mixture and evaporation of fuel are accelerated. The early and late split injection is off as one whole to the early side of a intake stroke and, in consequence, fuel sprayed through the late split injection sticks to a cylinder wall near when the piston reaches its bottom-dead-center (at the end of a intake stroke), so as to evade tardy accomplishment of a homogeneous distribution of fuel mixture. In particular, because the penetrating force of a spray of fuel is not so strong, the fuel stuck to the cylinder wall does not cause problems. In addition, there is certainly provided a long period of time allowed for fuel to evaporate before spark ignition of the fuel mixture, and a rise in intake air temperature by recirculated exhaust gas, which are always desirable for acceleration of evaporation of fuel. These effects mutually affect on one another to produce a greatly improved homogeneous fuel distribution and accelerate evaporation of fuel, increasing the combustion velocity of fuel mixture and significantly improving combustion stability of fuel mixture due to a shortened combustion time. The improved combustion stability makes it possible to admit a large amount of exhaust gas into an intake air stream, significantly lowering the amount of formation of nitrogen oxides (NOx) as well as improving specific fuel consumption due to a reduction in pumping loss. The lean NOx conversion catalyst, when it is of a NOx adsorption type, is acceleratingly refreshed by lowering the amount of formation of nitrogen oxides (NOx) while the engine operates with an enriched fuel charge so as thereby to greatly increase the HC concentration ratio (HC/NOx) or CO concentration ration CO/NOx. Accordingly, even during refreshing the lean NOx conversion catalyst, the fuel mixture can be made sufficiently lean as compared to the prior art engine control system, which is desirable to prevent or significantly reduce aggravation of specific fuel consumption and shocks that the driver feels. In these embodiment, the direct injection type of engine prevents fuel sprayed with high pressure through the fuel injector from sticking to intake valves so as thereby to evaporate more sufficiently and diffuse more homogeneously in the entire combustion chamber as compared to a port injection type of engine. While the direct injection type of engine provides a shorter period of time for liquid fuel sprayed through the fuel injector to evaporates than the port injection type of engine, the aggravation of evaporation is compensated by that tiny particles of liquid fuel are warmed by recirculated exhaust gas and acceleratingly evaporated. In other words, the direct injection type of engine provides only aggravation of combustion stability of fuel due to a large amount of recirculated exhaust gas less than the port injection type of engine, expanding a limit to the amount of recirculated exhaust gas in consequence. Accordingly, the direct injection type of engine permits a more large amount of exhaust gas to be recirculated in enriched homogeneous charge combustion zone than the port injection type of engine, so that the amount of formation of nitrogen oxides (NOx) is sufficiently lowered to rise the HC concentration ratio (HC/NOx) and/or the CO concentration ratio CO/NOx of exhaust gas, which is always desirable to prevent or significantly reduce aggravation of specific fuel consumption and shocks that the driver feels.

The late split injection may be timed to start at a point in one of first and middle divisions of three approximately equal divisions into which a intake stroke of said cylinder piston is divided. In this instance the midpoint of the late split injection is timed to start at a point before the midpoint of a intake stroke at which the cylinder piston attains a maximum down speed. When fuel is displayed such that the mid point of the late split injection is timed to start at a point before the midpoint of a intake stroke, an intake air stream entering the combustion chamber is greatly accelerated, so that fuel is homogeneously distributed in the entire combustion chamber.

The engine control system permits to recirculate exhaust gas into an intake air stream with an exhaust gas recirculation ratio (a ratio of an amount of recirculated exhaust gas to an amount of intake air) higher than 20%. Recirculating a large amount of exhaust gas provides a reduction in the amount of formation of nitrogen oxides (NOx) with an effect of significantly increasing the HC concentration ratio (HC/NOx) and/or the CO concentration ratio.

The split injection is made while the engine accelerates. Even in the accelerating zone where it is general to operate the engine with an enriched fuel mixture so as to accord with a demand for sufficiently high engine output, the lean NOx conversion catalyst is acceleratingly refreshed by spraying fuel through the split injection and admitting a large amount of exhaust gas into an intake air stream. A change in engine output resulting from enrichment of fuel mixture which accords to acceleration does not make the driver unpleasant.

When the engine is operated with a lean fuel charge continuously for a specified period of time, fuel is sprayed through the split injection and the fuel mixture is enriched. In this instance, a NOx adsorption type of lean NOx conversion catalyst which generally experiences aggravation of NOx adsorption performance while the engine operates with a lean fuel mixture for a relatively long period of time is refreshed by enriching a fuel mixture after the period of time. Further, after a lapse of a specified period of time from enriching a fuel mixture, a fuel mixture is made lean for improving specific fuel consumption. The enriched fuel mixture may have a stoichiometric air-fuel ratio of 14.7, which is quite desirable for improving specific fuel consumption and lowering shift shock due to a change in engine output greatly as compared to the prior art engine control system in which a fuel mixture is enriched to have an air-fuel ratio of 12 to 13.

The engine control system may be provided with an air stream control means, such as a control valve disposed in one of two intake ports and operative to shut the one intake port so as to admit intake air into the combustion chamber through the other intake port only, which creates an air stream in the combustion chamber. The air stream further accelerates accomplishment of a homogeneous fuel distribution with an effect of improving combustion stability. Accomplishment of a homogeneous fuel distribution is even more accelerated by employing a fuel injector of a type having a spray angle greater than approximately 45°.

BRIEF DESCRIPTION OF THE DRAWINGS

The foregoing and other objects and features of the present invention will be clearly understood from the following detailed description of preferred embodiments when read in conjunction with the accompanying drawings in which:

FIGS. 5(A) through 5(D) are a flow chart illustrating a sequence routine of fuel injection control for a microcomputer of an engine control unit;

FIG. 6 is a time chart of fuel injection for various engine operating zones;

FIG. 7 is a flow chart illustrating a sequence routine of exhaust gas recirculation control for the microcomputer of the engine control unit;

FIGS. 8(A) and 8(B) are graphs illustrating specific fuel consumption and Pi coefficient variation with respect to late split injection timing;

FIG. 9 is another time chart of fuel injection for various engine operating zones;

DETAILED DESCRIPTION OF THE PREFERRED EMBODIMENT

The term "NOx conversion" as used throughout the specification shall mean and refer to a reduction in the NOx content of exhaust gas due such as to NOx adsorption on a NOx adsorbing type of catalyst and reduction of NOx to $N_2$ and $O_2$ by a NOx reduction type of catalyst, and the term "lean NOx conversion catalyst" as used herein shall mean and refer to the type controlling or lowering an emission level of oxides of nitrogen (NOx) in a lean exhaust gas whose air-fuel ratio is $\lambda > 1$. Further, the term "HC concentration ratio" as used throughout the specification shall mean and refer to the ratio of HC concentration to NOx concentration and the term "CO concentration ratio" as used throughout the specification shall mean and refer to the ratio of HC concentration to NOx concentration.

Because direct injection-spark ignition type of gasoline engine is well known, the present description will be directed in particular to elements forming part of, or cooperating directly with, an engine control system in accordance with the present invention. It is to be understood that elements not specifically shown or described can take various forms well known to those skilled in the automobile art.

Figure 1:
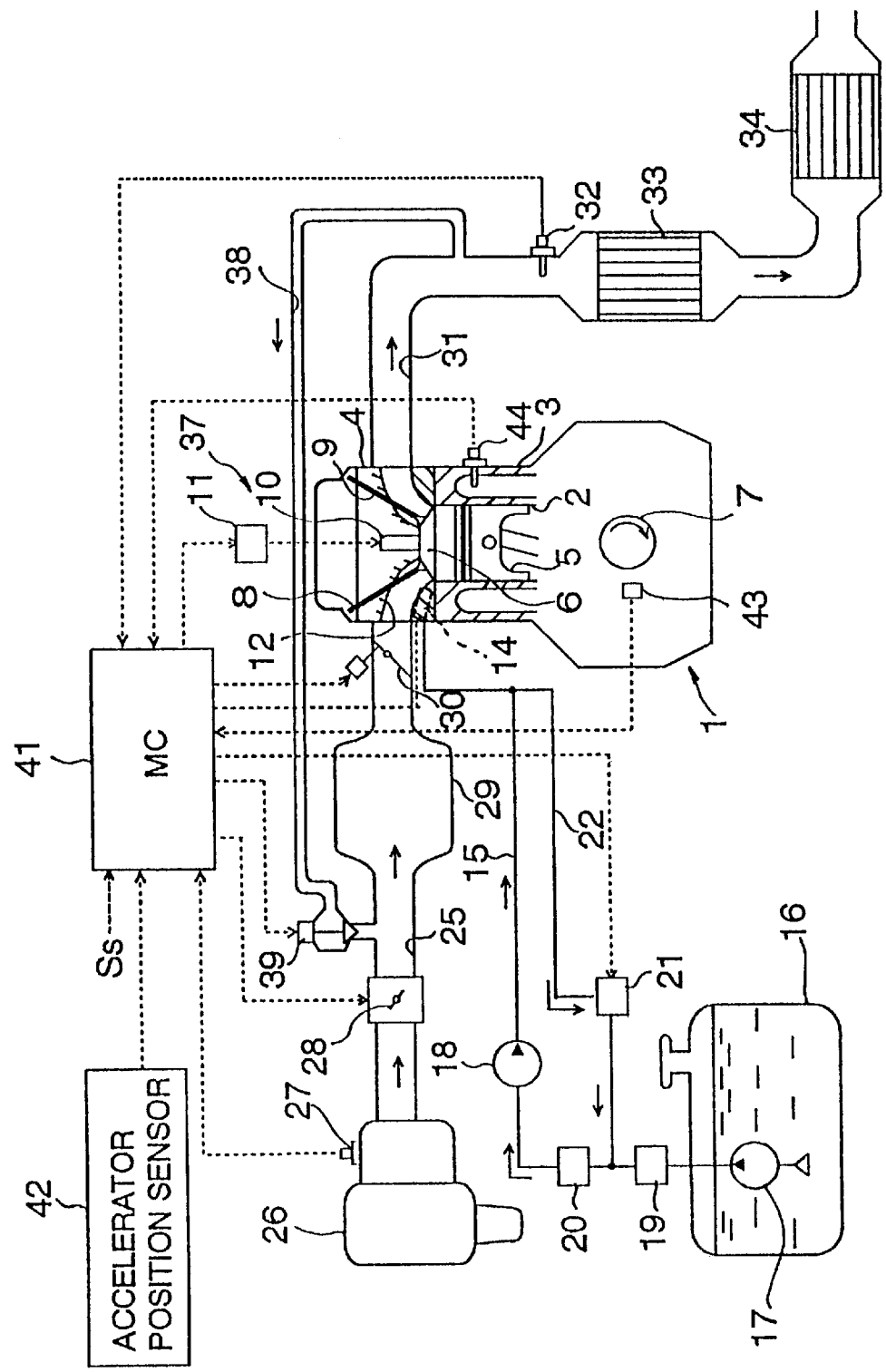
FIG. 1 is a schematic illustration of an engine control system in accordance with an embodiment of the invention.

Referring to the drawings in detail and, in particular, to FIG. 1 showing an engine control system in accordance with an embodiment of the invention, a fuel direct injection type of multiple cylinder engine 1 equipped with exhaust gas recirculation system, which is controlled by the engine control system, is comprised of a cylinder block 3 provided with cylinder bores 2 (only one of which is shown) in which pistons 5 can slide and a cylinder head 4 mounted on the cylinder block 3. A combustion chamber 6 is formed in the cylinder by the top of the piston 5, a lower wall of the cylinder head 4 and the cylinder bore 2. Two intake ports 12 (only one of which is shown) and one exhaust port 13 are opened into the combustion chamber 6, and are opened and shut at a predetermined timing by intake valves 8 and an exhaust valve 9, respectively. A fuel injector 14 is installed into the cylinder head 4 such that a spray of fuel is directly charged into the combustion chamber 6 from the side. The piston 5 at its top cavity (not shown) traps the spray of fuel in a later half of a compression stroke to form a stratum of relatively rich air-fuel mixture near the spark plug 10, so as thereby to form a stratified charge of air-fuel mixture in the combustion chamber 6. The fuel injector 14 has a wide-angle spray nozzle (not shown) having an angle of spray angle greater than 45°, so that a spray of fuel spreads at a wide angle in the combustion chamber 6 to form a homogeneous distribution of air-fuel mixture during a intake stroke. A spark plug 10 is installed in the cylinder head 4 such that electrodes of the spark plug 10 are placed down into the combustion chamber 6 and aligned with the vertical center line of the cylinder and connected to an ignition circuit 11 to ignite an air-fuel mixture in the combustion engine. A fuel line 15, through which the fuel is delivered to the fuel injector 14 from a fuel tank 16 is equipped with two fuel pumps, namely a low pressure fuel pump 17 disposed in the fuel tank 16 and a high pressure fuel pump 18 disposed the outside of the fuel tank 16. The fuel line 15 between the fuel pumps 17 and 18 is further equipped with a low pressure regulator 19 and a fuel filter 20 positioned in this order from the side of fuel tank 16. A fuel return line 22 equipped with a high pressure regulator 21 is connected to the fuel line 15 between a point after the high pressure fuel pump 18 and a point before the fuel filter 20. Fuel is drawn up from the fuel tank 16 by the low pressure pump 17, regulated in pressure by the low pressure regulator 19, and then multiplied in pressurized by the high pressure fuel pump 18 to the fuel injector 14. The high pressurized fuel is partly delivered to the fuel injector 14 and partly returned through the return fuel line 22. The high pressure regulator 21 regulates a return fuel quantity so as to optimize the pressurized fuel in pressure level directed to the fuel injector 14.

An intake line 25 has an air cleaner 26 at the upstream end and an intake manifold at the downstream end which is independently connected to the intake ports 12 of the cylinder. An intake valve 8 is provided in each intake port 12 and an air stream control valve 30 is provided either one of the intake ports 12 only. The air stream control valve 30, which may be of an actuator operated type, causes an air stream to be admitted into the combustion chamber 6 through only the other intake port 12 while it closes, which results in forming, for example, a swirl of intake air abundant in tumble components in a direction of the vertical axis of the cylinder. The intake line 25 is provided with a heat sensing type of air-flow sensor 27, an electrically controlled throttle valve 28 and a surge tank 29 in order from the upstream end. The throttle valve 28 is not controlled directly by an accelerator pedal but indirectly by an accelerator pedal through an actuator (not shown).

An exhaust line 31 through which exhaust gas are discharged into the atmosphere is provided with an oxygen sensor (which is hereafter referred to as an $O_2$ sensor) 32, a three-way catalyst 33 and a lean NOx conversion catalyst 34 in order from the upstream end. The $O_2$ sensor 32 monitors the oxygen concentration of exhaust gas based on which an air-fuel ratio is determined and provides an output sharply changing between before and after a stoichiometric air-fuel ratio. Each of the catalysts 33 and 34 is of a type using a cordierite honeycomb block coated with a catalytic material which allows exhaust gas to flow through. The three-way catalyst significantly lowers emission levels of unburnt hydrocarbons (HC), carbon monoxide (CO) and oxides of nitrogen (NOx) while the air-fuel mixture is richer than a stoichiometric mixture and has an excellent catalytic conversion efficiency in, in particular, a window, i.e. in a region of air-fuel ratios close to the stoichiometric air-fuel ratio. The lean NOx conversion catalyst 34, on one hand, adsorbs NOx in exhaust gas while the air-fuel mixture is leaner than a stoichiometric mixture and, on the other hand, desorbs or releases NOx into exhaust gas for catalyzing reduction of NOx while the air-fuel mixture is richer than a stoichiometric mixture. This type of lean NOx conversion catalyst may be provided by coating a honeycomb block with, for example, a single catalyst layer or double catalyst layers. In the case of using a single catalyst layer, the catalyst may contain noble metals such as platinum (Pt) rhodium (Rh), palladium (Pd) and the like, an alkaline metal such as potassium (K) and the like, and an alkaline-earth metal such as barium (Ba) and the like carried as catalytic metals by alumina or ceria. In the case of using double catalyst layer, a first or under catalyst layer may be comprised of platinum (Pt) and an alkaline-earth metal such as barium (Ba) and the like carried as catalytic metals by alumina or ceria, and a second or over catalyst layer is comprised of a noble metal such as platinum (Pt) and the like carried as a catalytic metal by zeolite. The three-way catalyst 33 and the lean NOx conversion catalyst 34 may be replaced in position with each other. Further, when employing one of the double catalyst layer types for the lean NOx conversion catalyst 34, the three-way catalyst 33 is not always installed.

An exhaust gas recirculation (EGR) system 37 is provided to admit exhaust gas partly into the intake line 25. The exhaust gas recirculation (EGR) system 37 has a recirculation line extending from the exhaust line 31 upstream the $O_2$ sensor 32 to the intake line 25 between the throttle valve 28 and the surge tank 29, and an electrically operated exhaust gas recirculation (EGR) valve 39 installed to the recirculation line 38 in a position close to the intake line 25. The amount of exhaust gas that is recirculated through the recirculation line 38 can be controlled by the EGR valve 39. This EGR valve 39 is designed to admit carefully controlled amounts of exhaust gas into the intake air stream.

Operation of the ignition circuit 11, the fuel injector 14, the high pressure regulator 21, the actuator of the throttle valve 28, the air stream control valve 30, the EGR valve and other electrically operated elements are controlled by a control unit 41 comprising a microcomputer MC. Various signals are transferred to the control unit 41 from at least the air-flow sensor 27, the $O_2$ sensor 32, an accelerator position sensor 42 which detects accelerator positions as engine loading, a crank angle sensor 43 which monitors angles of rotation of a crankshaft 7 of the engine as an engine speed of rotation, a temperature sensor 44 which monitors the temperature of engine cooling water to determine whether the engine 1 is in a cold condition, under a warming up, or in a warm condition, a position sensor (not shown) incorporated in the EGR valve 39 which monitors a valve lift of the EGR valve 39, and an engine starter (not shown). The fuel injector 14 is pulsed to open by energizing a solenoid according to a pulse width. The control unit 41 constantly monitors engine speed, load, throttle position, exhaust, temperature, etc to control the pulse width.

Figure 2:
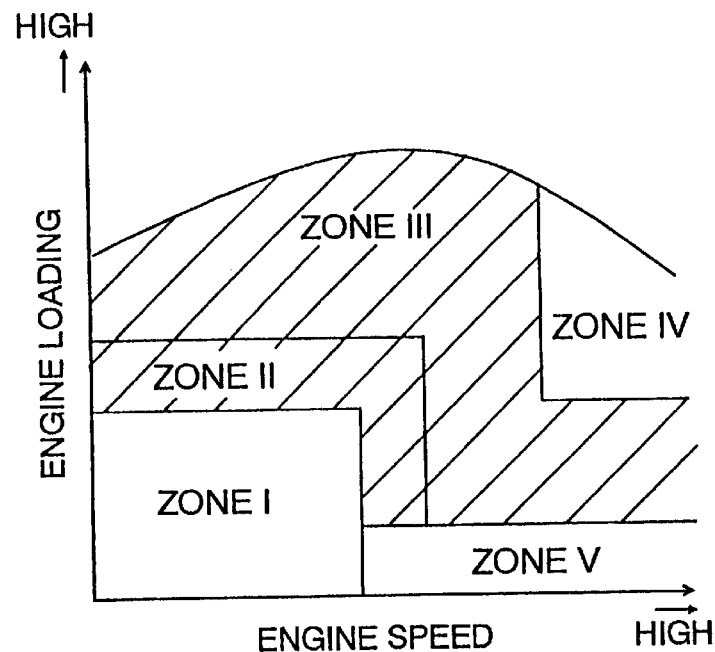
FIG. 2 is a diagram illustrating a map of fuel injection control zones for warm engine operation.
Figure 3:
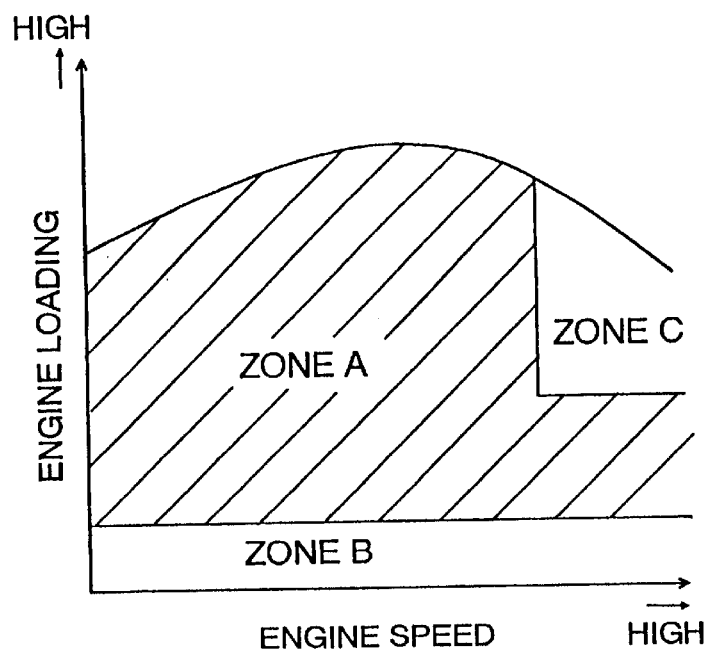
FIG. 3 is a diagram illustrating a map of fuel injection control zones for cold engine operation.
Figure 4:
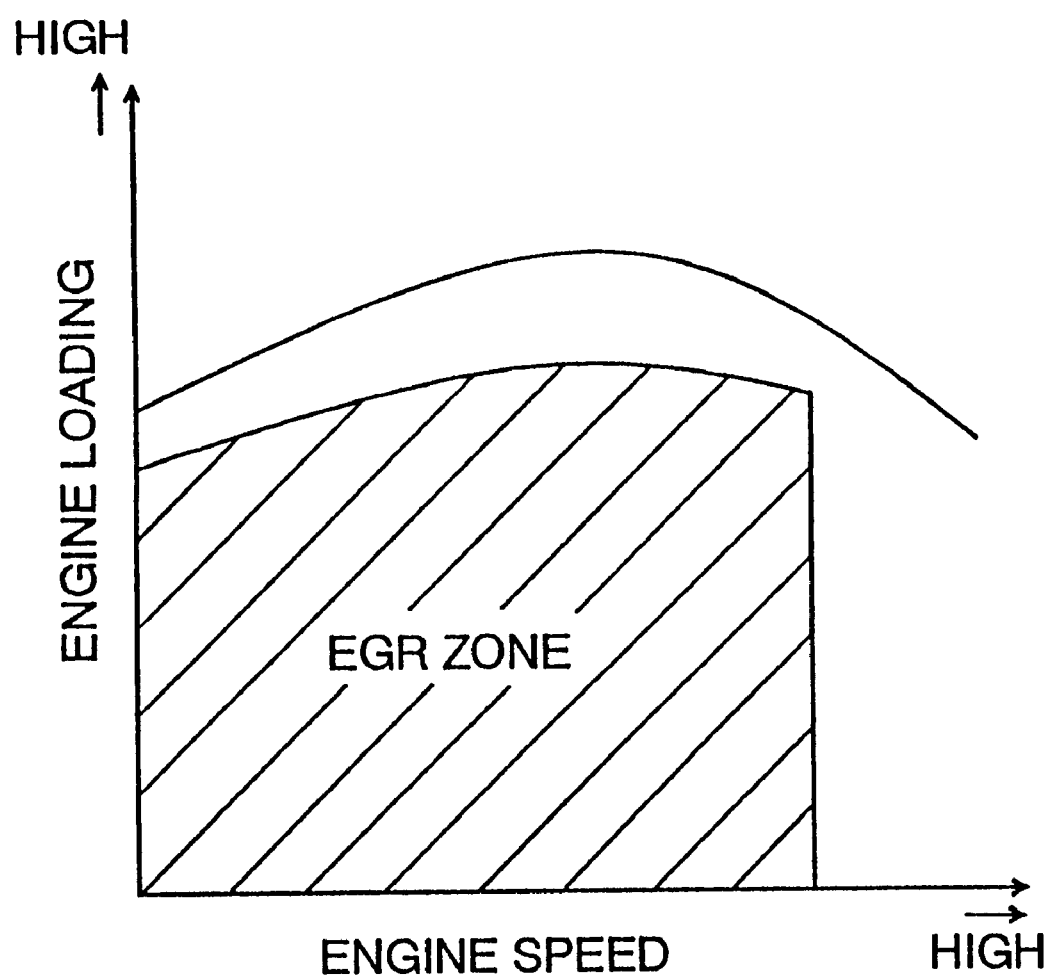
FIG. 4 is a diagram illustrating a map of exhaust gas recirculation zone.

FIGS. 2 and 3 show fuel charge control maps with engine speed and loading as parameters for warm engine operations and cold engine operations, respectively, which define a lean fuel charge zone in which the engine is charged with an air-fuel mixture of $\lambda>1$ and an enriched fuel charge zone in which the engine is charged with an air-fuel mixture of $\lambda<1$ and, in another aspect, a non-split injection zone in which a given amount of fuel is delivered all at once and a split injection zone in which a given amount of fuel is delivered through in two steps or through two split injection. Specifically, the fuel charge control map shown in FIG. 2 used while the engine is in a warm condition defines five engine control zones, namely a lean stratified charge zone (I), a lean homogeneous charge zone (II), and an enriched homogeneous charge zones (III)–(V). In the lean stratified charge zone (I) which is defined for lower engine loadings and lower to middle engine speeds, a given amount of fuel is sprayed all at once to cause lean stratified charge combustion immediately before an ignition timing at which the spark plug 10 is fired in a compression stroke. In the lean homogeneous charge zone (II) which is defined for lower to middle engine loadings and lower to middle engine speeds, a given amount of fuel is split into two parts and sprayed in two steps in a intake stroke to cause lean homogeneous charge combustion. In the enriched homogeneous charge zone (III) which is defined for higher engine loadings and higher engine speeds, a given amount of fuel is split into two parts and sprayed in two steps in a intake stroke to cause enriched homogeneous charge combustion. In the enriched homogeneous charge zone (IV) which is defined for higher engine loadings and higher engine speeds, a given amount of fuel is sprayed all at once in a intake stroke to cause enriched homogeneous charge combustion. In the enriched homogeneous charge zone (V) which is defined for lower engine loadings and middle to higher engine speeds, a given amount of fuel is sprayed all at once in a intake stroke to cause enriched homogeneous charge combustion. All these zones (I)–(V) are established so as not to overlap one another. The fuel charge control map shown in FIG. 3 used while the engine is in a cold condition defines three enriched homogeneous charge zones (A), (B) and (C). In the enriched homogeneous charge zone (A) which is defined for middle to higher engine loadings and lower to higher engine speeds, a given amount of fuel is split into two parts and sprayed in two steps in a intake stroke to cause enriched homogeneous charge combustion. In both enriched homogeneous charge zone (B) which is defined for lower engine loadings and lower to higher engine speeds and enriched homogeneous charge zone (C) which is defined for higher engine loadings and higher engine speeds, a given amount of fuel is sprayed all at once in a intake stroke to cause enriched homogeneous charge combustion. These three zones (A)–(C) are established so as not to overlap one another. While the engine operates in any one of the engine control zones (II), (III) and (A) shaded in FIGS. 2 and 3 in which split injection is made in a intake stroke, the EGR system 37 is actuated to admit amounts of exhaust gas controlled by the EGR valve 39 into the intake air stream. An exhaust gas recirculation (EGR) rate, which is a rate of the amount of exhaust gas that is recirculated relative to the amount of exhaust gas that is produced resulting from combustion varies according to engine speed and loading. As will be described later, is set to 20 to 40% in this embodiment, which is significantly large as compared with the prior art EGR systems. As shown in FIG. 4, an EGR zone may be defined as shaded. The EGR zone covers the lean stratified charge zone (I), the lean homogeneous charge zone (II) and the enriched homogeneous charge zone (III) excepting a higher engine loading region for warm conditions, and the enriched homogeneous charge zone (A) excepting a higher engine loading region for cold conditions.

FIGS. 5(A) through 5(D) show a flow chart illustrating a sequence routine of fuel charge control.

As shown, when the flow chart logic commences and control proceeds directly to a function block at step S101 where signals Ne, Tv, Qa, Tw and Ss representative of various control factors such as engine speed, accelerator position, intake air quantity, cooling water temperature and a starter signal, respectively, are read into the control unit 41. Subsequently, a decision is made at step S102 as to whether the engine 1 starts. When there is an occurrence of a starter signal Ss and the engine speed Ne is lower than a specified speed, an engine start is ascertained. When the answer is affirmative, an injection pulse width TaK at the engine start is calculated at step S103. The given amount of fuel is divided into two parts for early split injection and late split injection made in an intake stroke according to a split ratio represented by a split factor c (1>0). For this purpose, the injection pulse width TaK is divided into two split injection pulse widths TaK1 which is expressed by c x TaK and TaK2 which is expressed by (1–c) x TaK at step S104. At the beginning of engine operation, a given amount of fuel is neither sprayed in non-split intake stroke injection nor in non-split compression stroke injection, and simultaneously both non-split intake stroke injection pulse width TaK3 and non-spilt compression stroke injection pulse width TaD are set to 0 (zero). Thereafter, split injection timings s1 and s2 for the early and late split injection are determined, respectively, at step S105. As shown by (b) in FIG. 6, the early and late split injection timings s1 and s2 are predetermined. That is, the early split injection timing s1 for the early split injection is dictated by an angle of rotation of the crankshaft 7 in an early half of a intake stroke and, more specifically, at a crank angle 45 to 50 degrees before top-dead-center in a intake stroke, and the late split injection is timed to start at a point s2 in a later half of the intake stroke and, more specifically, at a crank angle 100 to 120 degrees after top-dead-center in the intake stroke. After the determination of early and late split injection timings s1 and s2 at step S105, a decision is made at step S117 as to whether it is the early split injection timing s1 for the early split injection. After waiting up to the early split injection timing s1 at step S117, the fuel injector 14 is pulsed to open to deliver the amount of fuel depending upon the early split injection pulse width TaK1 at step S118. Similarly, a decision is subsequently made at step S119 as to whether it is the late split injection timing s2 for the late split injection. After waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

On the other hand, when the answer to the decision as to engine start made at step S102 is negative, another decision is made at step S106 as to whether the cooling water temperature Tw is higher than a specified value Two, i.e. whether the engine 1 is in a warm condition. When the answer is affirmative, then, still another decision is made at step S107 as to whether the engine operating condition is in the lean stratified charge zone (I) for lower engine loadings and middle to higher engine speeds of the fuel charge control map for warm engine operation shown in FIG. 2. When the engine operating condition, or the engine loading and speed, is in the lean stratified charge zone (I), a non-split compression stroke injection pulse width TaD for the lean stratified charge combustion is calculated at step S108. In the lean stratified charge zone (I), neither split injection nor non-split intake stroke injection is made, both split injection pulse widths TaK1 and Tak2 and non-split intake stroke injection pulse width TaK3 are set to 0 (zero) at step S109. Thereafter, a non-split compression stroke injection timing s3 is determined at step S110. As shown by (a) in FIG. 6, the non-split compression stroke injection timing s3 is predetermined. That is, the non-split compression stroke injection timing s3 is set in a later half of a compression stroke. Subsequently, a decision is made at step S111 as to whether it is the injection timing s3 for the non-split compression stroke injection. After waiting up to the non-split compression stroke injection timing s3 at step S111, the fuel injector 14 is pulsed to open to deliver the amount of fuel depending upon the non-split compression stroke injection width TaD at step S112. After a conclusion of the non-split compression stroke injection, the flow chart logic returns to restart the sequence routine.

When the answer to the decision as to engine operating condition made at step S107 is negative, another decision is subsequently made at step S113 as to whether the engine operating condition is in the lean homogeneous charge zone (II) for lower engine loadings and lower to middle engine speeds of the fuel charge control map for warm engine operation shown in FIG. 2. When the engine operating condition, or the engine loading and speed, is in the lean homogeneous charge zone (II), an injection pulse width TaK for lean homogeneous charge combustion is calculated at step S114. The given amount of fuel is divided into two parts for early and late split injection made in a intake stroke according to a split ratio represented by a split factor a (1>0) at step S115. The injection pulse width TaK is divided into an early split injection pulse width TaK1 which is expressed by a×TaK and a late split injection pulse width TaK2 which is expressed by (1−a)×TaK. In the lean homogeneous charge zone (II) the given amount of fuel is neither sprayed in non-split intake stroke injection nor in non-split compression stroke injection and consequently both non-split intake stroke injection pulse width TaK3 and non-spilt compression stroke injection pulse width TaD are set to 0 (zero). Thereafter, early and late split injection timings s1 and s2 are determined as shown by (b) in FIG. 6 at step S116, After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the engine operating condition is out of the lean homogeneous charge zone (II), another decision is subsequently made at step S121 as to whether the engine operating condition is in the enriched homogeneous charge zone (III) for middle to higher engine loadings and lower to higher engine speeds of the fuel charge control map for warm engine operation shown in FIG. 2. When the engine operating condition, or the engine loading and speed, is in the enriched homogeneous charge zone (III), an injection pulse width TaK for enriched homogeneous charge combustion is calculated at step S122. The given amount of fuel is divided into two parts for the early and late split injection made in a intake stroke according to a split ratio represented by a split factor b (1>0) at step S123. The injection pulse width TaK is divided into an early split injection pulse width TaK1 which is expressed by b×TaK and a late split injection pulse width TaK2 which is expressed by (1−b)×TaK. In the enriched homogeneous charge zone (III) the given amount of fuel is sprayed neither in non-split intake stroke injection nor in non-split compression stroke injection and consequently both non-split intake stroke injection pulse width TaK3 and non-spilt compression stroke injection pulse width TaD are set to 0 (zero). In the same manner as in the lean homogeneous charge zone (II), early and late split injection timings s1 and s2 are determined as shown by (b) in FIG. 6 at step S124. After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the answer to the decision as to the enriched homogeneous charge combustion is negative, this indicates that the engine operating condition is in either the enriched homogeneous charge zone (IV) for higher engine loadings and higher engine speeds or the enriched homogeneous charge zone (V) for lower engine loadings and middle to higher engine speeds, then, an injection pulse width TaK for enriched homogeneous charge combustion is calculated at step S126. In the zone (IV) or (V), the given amount of fuel is sprayed all at once in a intake stroke, the injection pulse width TaK is employed as a non-split intake stroke injection pulse width TaK3 at step S127. Simultaneously, both split injection pulse widths TaK1 and Tak2 and non-split compression stroke injection pulse width TaD are set to 0 (zero). Thereafter, a non-split intake stroke injection timing s4 is determined at step S128. As shown by (c) in FIG. 6, the non-split intake stroke injection timing s4 is predetermined. That is, the non-split intake stroke injection timing s4 is set such that the non-split intake stroke injection is started at approximately the midpoint of a intake stroke. Subsequently, after waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

Further, when the answer to the decision as to cooling water temperature Tw made at step S106 is negative, this indicates that the engine 1 is still in a cold condition, then, another decision is subsequently made at step S125 as to whether the engine operating condition is in the enriched homogeneous charge zone (A) for middle to middle to higher engine loadings of the fuel charge control map for cold engine operation shown in FIG. 3. When the engine operating condition, or the engine loading and speed, is in the enriched homogeneous charge zone (A), steps S122–S124 and S117 through S120 are taken to cause early and late split infection in a intake stroke to deliver the given amounts of fuel depending upon the early and late split injection pulse widths TaK1 and TaK2.

On the other hand, when the answer to the decision as to engine operating condition made at step S125 is negative, this indicates that the engine operating condition is either the enriched homogeneous charge zone (B) for lower engine loadings or the enriched homogeneous charge zone (C) for higher engine loadings and higher engine speeds, then, a given amount of fuel is sprayed in non-split intake stroke injection. An injection pulse width TaK for enriched homogeneous charge combustion is calculated at step S126 and is employed as a non-split intake stroke injection pulse width TaK3 at step S127. Simultaneously, both split injection pulse widths TaK1 and Tak2 and non-split compression stroke injection pulse width TaD are set to 0 (zero). After waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

In the engine operation control system according to the above embodiment, the midpoint m between the early and late split injection timings s1 and s2 is positioned before the midpoint of a intake stroke which is at a crank angle 90 degrees after top-dead-center. Each injection pulse split factor a, b, c is set approximately 0.5, which divides a given amount of fuel into two exact halves for early and late split injection.

FIG. 7 shows a flow chart illustrating a sequence routine of exhaust gas recirculation control by controlling the EGR valve 39.

As shown, when the flow chart logic commences and control proceeds directly to a function block at step S201 where signals Ne, Tv, Qa, Tw, Lv and Ss representative of various control factors such as engine speed, accelerator position, intake air quantity, cooling water temperature, EGR valve lift and a starter signal, respectively, are read into the control unit 41. Subsequently, a decision is made at step S202 as to whether the engine 1 starts. When there is an occurrence of a starter signal Ss and the engine speed Ne is lower than a specified speed, an engine start is ascertained. When the answer is affirmative, the flow chart logic returns to restart the sequence routine. On the other hand, the answer to the decision is negative, another decision is made at step S203 as to whether the cooling water temperature Tw is higher than the specified value Two, i.e. whether the engine 1 is in a warm condition. When the answer is affirmative, then, still another decision is made at step S204 as to whether the engine operating condition is in the lean homogeneous charge zone (II) for lower to middle engine loadings and lower to middle to higher engine speeds of the fuel charge control map for warm engine operation shown in FIG. 2. When the engine operating condition, i.e. the engine loading and speed, is in the lean homogeneous charge zone (II), a target valve lift Lv(LHW) of the EGR valve 39 for lean homogeneous charge combustion for warm engine operation is calculated at step S205. On the other hand, when the answer as to engine operating condition made at step S204 is negative, then, another decision is made at step S207 as to whether the engine operating condition is in the enriched homogeneous charge zone (III) for middle to higher engine loadings of the fuel charge control map for warm engine operation shown in FIG. 2. When the engine operating condition is in the enriched homogeneous charge zone (III), a target EGR valve lift Lv(RHW) of the EGR valve 39 for enriched homogeneous charge combustion for warm engine operation is calculated at step S208. Further, when the answer to the decision as to cooling water temperature Tw made at step S203 is negative, another decision is made at step S209 as to whether the engine operating condition is in the enriched homogeneous charge zone (A) for middle to higher engine loadings of the fuel charge control map for cold engine operation shown in FIG. 3. When the engine operating condition, i.e. the engine loading and speed, is in the enriched homogeneous charge zone (A), a target EGR valve lift Lv(LHC) of the EGR valve 39 for lean homogeneous charge combustion for cold engine operation is calculated at step S210. After calculation of a target valve lift Lv(LHW), Lv(RHW) or Lv(RHC) at step S205, S208 or S210, respectively, the EGR valve 39 is actuated to admit exhaust gas into an intake air stream according to the valve lift Lv(LHW), Lv(RHW) or Lv(LHC) at step S206. When the target valve lift Lv(LHW), Lv(RHW) or Lv(RHC) is attained, the flow chart logic returns to restart the sequence routine. Further, in the case where the engine operating condition is neither in any one of the lean homogeneous charge zone (II) and the enriched homogeneous charge zone (III) for warm engine operation nor in the enriched homogeneous charge zone (A) for cold engine operation, the flow chart logic returns to restart the sequence routine without recirculating exhaust gas.

In operation of the engine control system according to the above embodiment of the invention, immediately after an engine start, a given amount of fuel is divided into two parts and sprayed through early and late split injection in a intake stroke as shown by (b) in FIG. 6. During idling after the engine start, while the engine 1 is monitored to be still in a cold condition in which the cooling water temperature Tw is lower than the specified value Two and in the enriched homogeneous charge zone (B) for lower engine loadings or the enriched homogeneous charge zone (C) for higher engine loadings and higher engine speeds, a given amount of fuel is sprayed all at once in a intake stroke as shown by (c) in FIG. 6. Further, during in cold engine operation, when the engine 1 operates in the enriched homogeneous charge zone (A) for middle to higher engine loadings, a given amount of fuel is divided into two parts and sprayed through early and late split injection in a intake stroke as shown by (b) in FIG. 6.

After the cooling water temperature Tw reaches the specified value Two, or during in warm engine operation, a given amount of fuel is divided into two parts and sprayed through early and late split injection in a intake stroke as shown by (b) in FIG. 6 when the engine 1 operates in the lean homogeneous charge zone (II) for lower to middle engine loadings and lower to middle engine speeds or in the enriched homogeneous charge zone (III) for middle to higher engine loadings. On the other hand, a given amount of fuel is sprayed all at once in a compression stroke as shown by (a) in FIG. 6 when the engine 1 operates in the lean stratified homogeneous charge zone (I) for lower engine loadings and lower to middle engine speeds or in a intake stroke as shown by (c) in FIG. 6 when the engine 1 operates in the enriched homogeneous charge zone (IV) for higher engine loadings and higher engine speeds or in the enriched homogeneous charge zone (V) for lower engine loadings and middle to higher engine speeds. Further, while the engine operates in the zone in which a given amount of fuel is sprayed through early and late split injection in a intake stroke, i.e. in any one of the enriched homogeneous charge zone (A), the lean homogeneous charge zone (II) and the enriched homogeneous charge zone (III), the EGR valve 39 is actuated to admit exhaust gas in the exhaust line 31 partly into an intake air stream in the intake line 25. Practically, the exhaust gas recirculation (EGR) rate is significantly low while the engine operates with higher loadings in the enriched homogeneous charge zone (A) and the enriched homogeneous charge zone (III). The EGR valve 39 may be shut in the higher loading zone as shown in FIG. 4.

When a given amount of fuel is divided into two parts and sprayed in two steps through early and late split injection in a intake stroke, the part of fuel sprayed through the early split injection is homogeneously diffused in the combustion chamber 6 with an increase in volume of the combustion chamber 6 following a down stroke of the piston 5 before the late split injection. Subsequently, the part of fuel splayed through the late split injection is diffused, so as to provide a homogeneous distribution of air-fuel mixture in the entire combustion chamber 6. That is, the split injection provides a homogeneous distribution of air-fuel mixture in the entire combustion chamber 6 without enhancing penetrating force of a spray of fuel. The early and late split injection which is shifted as one whole a little to the early side of a intake stroke prevents or significantly reduces sticking of sprayed fuel through the late split injection to the side wall of the cylinder bore 2 when the piston 5 reaches near bottom-dead-center or at the end of a intake stroke, which is always desirable for a homogeneous distribution of fuel in the combustion chamber 6. In particular, sprayed fuel moderated in penetrating force through the split injection prevents sprayed fuel from sticking to the side wall of the cylinder bore 2. Furthermore, there is provided a long time before fuel ignition for which fuel is allowed to be sprayed and evaporate, and recirculated exhaust gas raises the temperature of air introduced into the intake line 28 with an effect of warming a spray of fuel, so that fuel evaporation is even more accelerated. The air stream control valve 30 is actuated to admit intake air into the combustion chamber 6 through one of the intake ports 12 only with an effect of producing a swirl of intake air which causes an accelerated homogeneous distribution of fuel and accelerated evaporation of fuel in the combustion chamber 6. The mutually potentiating effect of the acceleration of a homogeneous distribution of fuel and evaporation of fuel provides a big raise in combustion velocity, so as to improve specific fuel consumption due to a reduction in combustion time and increase combustion stability of the engine 1.

In order to empirically demonstrate the extent of the improvement of combustion stability, measurements of combustion stability and changes in specific fuel consumption of an engine were made in such a manner that, while a given amount of fuel was divided into two approximately equal parts for early and late split injection, the early split injection was fixed at a point s1 an early stage of a intake stroke and the late split injection was timed to start at a point s2 changing in a period of time lying between a intake stroke and a subsequent compression stroke. The result of measurements is shown in FIGS. 8(A) and 8(B).

Referring to FIG. 8(A) showing the coefficient variation of indicated mean effective pressure (Pi coefficient variation), it is proved that, as the early split injection timing s1 is advanced, the Pi coefficient variation and the specific fuel consumption lower. In ore detail, when the early split injection is timed to start at a point s1 before reaching a crank angle of 120° after top-dead center, i.e. at a point in an early-to-middle division of a intake stroke, both Pi coefficient variation and specific fuel consumption are reduced more as compared to the case where a given amount of fuel is sprayed through non-split injection. The Pi coefficient variation and the specific fuel consumption are reduced greatly as the late split injection timing s2 is advanced. Accordingly, in a zone where the given amount of fuel, and hence a injection pulse width, is small such as, for example, low loading and low speed engine operating zones, the Pi coefficient variation and the specific fuel consumption are reduced even more greatly when the late split injection is advanced so as to end before an crank angle of 120° after top-dead center.

As shown in FIG. 9, when the midpoint of a late split injection period is put at a point, for example at a crank angle of 86° after top-dead center, where the piston 5 attains the highest lowering speed before the midpoint M of a intake stroke, the late split injection is made in a condition where the piston 5 moves down with the highest speed with an effect of causing an intake air stream to enter with the highest speed, a spray of fuel through the late split injection is homogeneously distributed in the combustion chamber 6 by the intake air stream, which provides the improvement of combustion stability and specific fuel consumption. In this instance, the timing of early split injection s1 is fixed at crank angle of 20° after top-dead center, and the timing of late split injection s2 is fixed at crank angle of 70° after top-dead center.

According to the embodiment, the significantly great improvement of combustion stability yields an increase in the amount of recirculated exhaust gas which is significantly large as compared to the prior art fuel charge control. In order to prove the improvement of Pi coefficient variation according to the split injection control of the invention, measurements of the Pi coefficient variation following a change in exhaust gas recirculation (EGR) rate changing from 0 to 60% were made as to the case where the engine 1 was operated with a stoichiometric mixture. The result is shown together with the Pi coefficient variation resulting from non-split injection control in FIG. 10.

Figure 10:
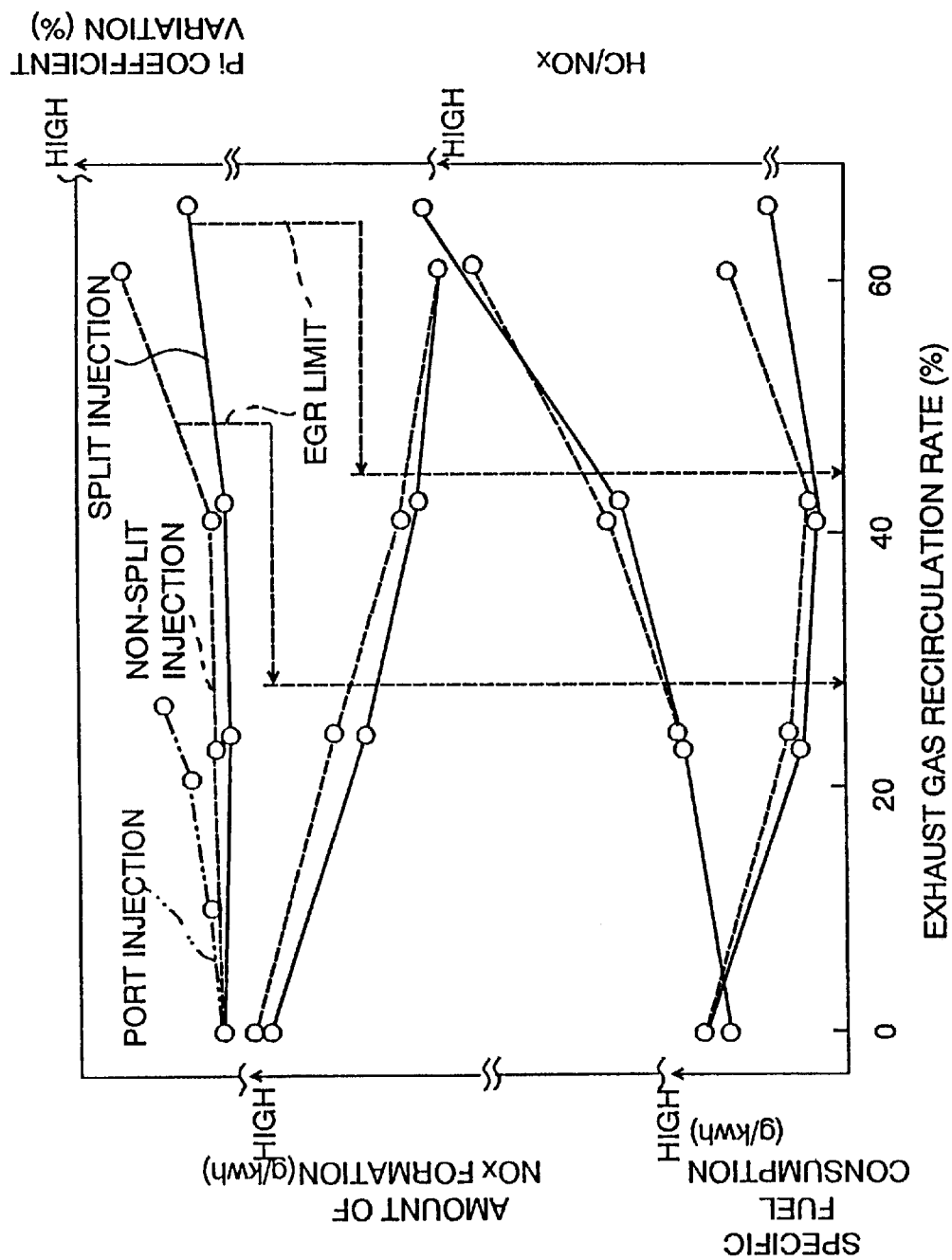
FIG. 10 is a diagram illustrating the amount of formation of nitrogen oxides (NOx) and specific fuel consumption with respect to exhaust gas recirculation rate.

As apparent in FIG. 10, it is proved that an increase in Pi coefficient variation is made significantly greater by split injection than by non-split injection or by port fuel injection. In more detail, in the case of port fuel injection where a given amount of fuel is delivered all at once into an intake port, the upper limit of exhaust gas recirculation (EGR) rate is approximately 20% or slightly higher. If the upper limit of exhaust gas recirculation (EGR) rate is exceeded, the engine 1 encounters variations of combustion in excess, which always causes sharp aggravation of drivability. For this reason, when considering fluctuations in the amount of practically recirculated exhaust gas due to a delay in operation of the EGR valve 39, the upper limit of exhaust gas recirculation (EGR) rate has to be set between approximately 10 and 15%. In the case where the engine 1 is of a direct injection-spark ignition type in which fuel is sprayed directly into the combustion chamber 6, the non-split injection expands the upper limit of exhaust gas recirculation (EGR) rate as high as 40% or higher, it is permitted to set the exhaust gas recirculation (EGR) rate to approximately 25%. The early and late split injection expand the upper limit of exhaust gas recirculation (EGR) rate as high as 60% or higher, it is permitted to set the exhaust gas recirculation (EGR) rate to approximately 40% even taking account of fluctuations in the amount of practically recirculated exhaust gas due to a delay in operation of the EGR valve 39.

FIG. 10 further shows specific fuel consumption, the amount of NOx formation, HC concentration ratio (HC/NOx) (which refers to a ratio of hydrocarbon concentration relative to nitrogen oxides concentration) with respect to exhaust gas recirculation (EGR) rate. While for exhaust gas recirculation (EGR) rates less than 40%, the specific fuel consumption is decreased due to an increase in the amount of exhaust gas admitted into the intake air stream which is accompanied by a decrease in pumping loss of the engine 1, whereas, for exhaust gas recirculation (EGR) rates greater than 40%, there occurs aggravation of combustion, which is always accompanied by aggravation of specific filel consumption. The emission level of NOx lowers gradually, but sharply particularly in the extent of exhaust gas recirculation (EGR) rate between 0 and 40%, with an increase in the amount of recirculated exhaust gas. On the other hand, the HC concentration ratio NC/NOx increases gradually, but sharply particularly in the extent of exhaust gas recirculation (EGR) rate higher than 40%, with an increase in the amount of recirculated exhaust gas. The reason of this is considered that the NOx concentration becomes higher than the HC concentration in the extent of exhaust gas recirculation (EGR) rate between 0 and 40%, as a result of which a change in HC concentration ratio (HC/NOx) becomes smaller relative to a change in NOx concentration and that the NOx concentration becomes lower than the HC concentration in the extent of exhaust gas recirculation (EGR) rate above 40%, as a result of which a change in HC concentration ratio (HC/NOx) becomes greater relative to a change in NOx concentration.

According to the embodiment described above, in the lean homogeneous zone (II) for lower to middle engine loadings and lower to middle engine speeds, while the combustion stability of the engine 1 is significantly improved by the split injection control, the improvement of specific fuel consumption and a significant reduction in the amount of NOx formation are realized by controlling the EGR valve 39 so as to admit exhaust gas with an exhaust gas recirculation (EGR) rate higher than 20%, for example with a maximum exhaust gas recirculation (EGR) rate of 40%. Similarly, in the enriched homogeneous zone (III) for middle to higher engine loadings, the improvement of specific fuel consumption and a significant reduction in the amount of NOx formation are realized by performing the split injection control and recirculating exhaust gas with an exhaust gas recirculation (EGR) rate higher than 20%, for example with a maximum exhaust gas recirculation (EGR) rate of 40%. Furthermore, as described above, since the HC concentration ratio (HC/NOx) becomes higher with progress of fuel combustion, refreshing the lean NOx conversion catalytic 34 is accelerated without increasing the air-filel ratio so low.

Figure 11A:
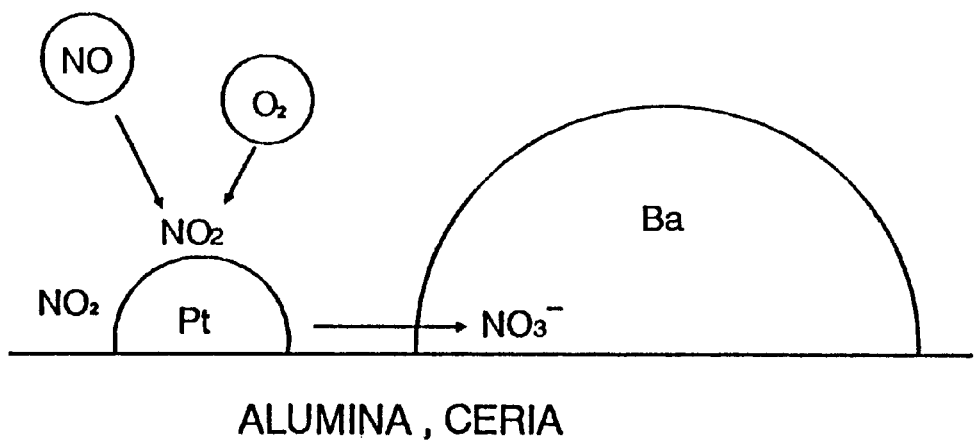
FIGS. 11(A) and 11(B) are illustrations showing mechanisms of absorption of NOx, and desorption and reduction of NOx of a NOx adsorption type of lean NOx conversion catalyst.

Although it has not yet been elucidated exactly how the lean NOx conversion catalyst adsorbs NOx and catalyzes reduction of NOx, it is considered that, generally describing, the lean NOx conversion catalyst works as follows:

As shown in FIG. 11 (A), in a lean atmosphere in which the air-fuel ratio is high or the oxygen content of exhaust gas is high in excess, nitrogen monoxide (NO) and oxygen ($O_2$) react on platinum (Pt) particles as an activated species to form nitrogen dioxide ($NO_2$). The nitrogen dioxide ($NO_2$) is partly oxidized on the platinum (Pt) particles, and it is adsorbed by and diffused in the form of nitric acid ion in barium (Ba) particles.

$$BaCO_{3+NO2} \rightarrow Ba(NO_3)_2 + CO_2 \tag{1}$$

Figure 11B:
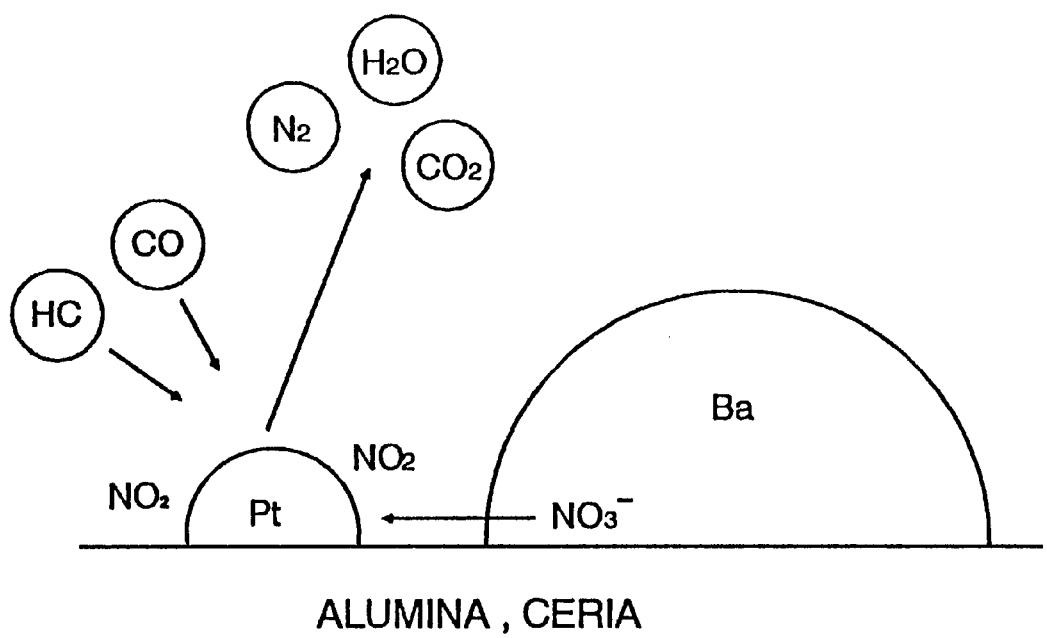

On the other hand, in an rich atmosphere in which the air-fuel ratio is low, a reaction progresses in a reverse manner as compared with the reaction in the lean atmosphere. As shown in FIG. 11(B), while $NO_2$ reacts with HC and CO on platinum (Pt) particles on to be deoxidized, the $NO_2$ is promptly desorbed from the barium (Ba) particles.

$$Ba(NO_3)_2 + CO_2 \rightarrow BaCO_3 + NO_2 \tag{2}$$

$$NO_2 + HC + CO \rightarrow N_2 + H_2O + CO_2 \tag{3}$$

In the mechanism of NOx absorption and reduction of NOx, it has been known that, when the rich atmosphere is even more enriched, combustion increases the amounts of HC and CO formation, so as to accelerate desorption of $NO_2$ from the lean NOx conversion catalyst and catalyze reduction of the $NO_2$. Further, since HC and CO react with NOx in exhaust gas, when combustion increases the amount of NOx formation, the HC and CO are consumed by reaction with the NOx produced from combustion and is too insufficient to deoxidize NOx on the platinum (Pt) articles in the lean NOx conversion catalyst. That is, when the NOx concentration of exhaust gas is high, the reactions expressed by the chemical formulas (2) and (3) does not adequately proceeds, impeding the lean NOx conversion catalyst from being refreshed. In short, since refreshing the NOx adsorption type of lean NOx conversion catalyst is greatly affected not only by HC concentration and CO concentration of exhaust gas but rather by the NOx concentration of exhaust gas, it is suitable to employ the HC concentration ratio (HC/NOx) as a parameter quantitatively expressing refreshing action of the lean NOx conversion catalyst, and in order to accelerate refreshing the lean NOx conversion catalyst, it is considered to be necessary to increase the HC concentration ratio (HC/NOx). Because a CO concentration ratio CO/NOx rises as well as the HC concentration ratio (HC/NOx) as the NOx concentration of exhaust gas lowers, the CO concentration ratio CO/NOx may be employed as a parameter quantitatively expressing refreshing action of the lean NOx catalyst.

Figure 12A:
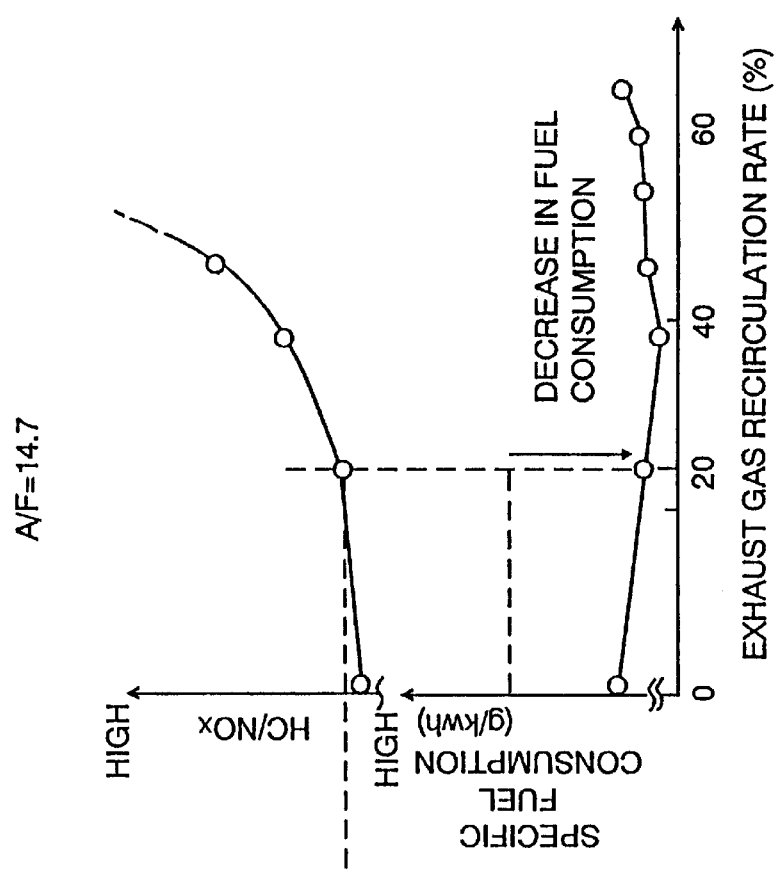
FIGS. 12(A) and 12(B) are graphical illustrations showing HC concentration ratio ((HC/NOx)) and specific fuel consumption with respect to air-fuel ratio and exhaust gas recirculation ratio, respectively.
Figure 12B:
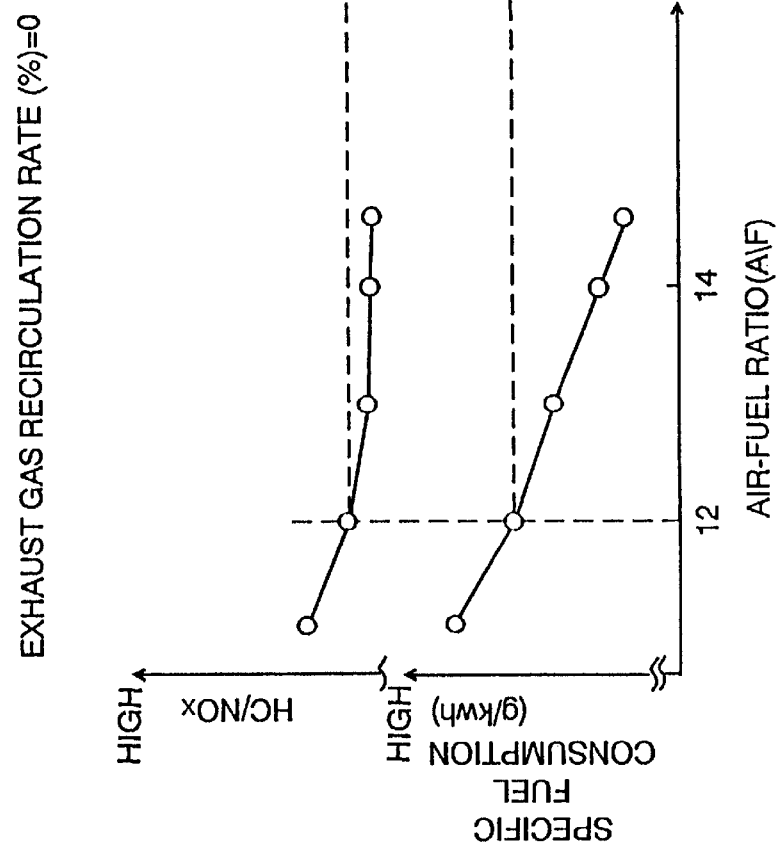

FIGS. 12(A) and 12(B) show, respectively, specific fuel consumption and HC concentration ratio (HC/NOx) relative to exhaust gas recirculation (EGR) rate when the air-fuel ratio is fixed at 14.7 (stoichiometric ratio) and specific fuel consumption and HC concentration ratio (HC/NOx) relative to air-fuel ratio when the exhaust gas recirculation (EGR) rate is fixed at 0%. It has been known in the art that refreshing the lean NOx conversion catalyst can be sufficiently accelerated by rising the air-fuel ratio (A/F) up to approximately 12. When lowering the air-fuel ratio to a stoichiometric ratio of 14.7 as shown in FIG. 12(A), the HC concentration ratio (HC/NOx) of exhaust gas is risen at an exhaust gas recirculation (EGR) rate of 22%, which is as high as that attained at an air-fuel ratio of 12 while there is no recirculation of exhaust gas as shown in FIG. 12(B). It is proved from the fact that while a stoichiometric air-fuel ratio is somewhat low in order to refresh the lean NOx conversion catalyst, nevertheless, when the exhaust gas recirculation (EGR) rate is approximately 22%, it provides a refreshing action equal to an air-fuel ratio of approximately 12. According to the embodiment, in the enriched homogeneous zone (III) for middle to higher engine loadings, the split injection is extremely effective to elevate the combustion stability of the engine 1 and provides a maximum permissible exhaust gas recirculation (EGR) rate of approximately 40%. The increased amount of exhaust gas extremely lowers the amount of NOx formation with an effect of rising the HC concentration ratio, as a result of which the lean NOx conversion catalyst is expeditiously refreshed. Accordingly, even in the enriched homogeneous zone (III) for middle to higher engine loadings, it is possible to control fuel injection so as to lower the air-fuel ratio sufficiently, which is desirable to improve the specific fuel consumption without providing aggravation of refreshing action.

Figure 13:
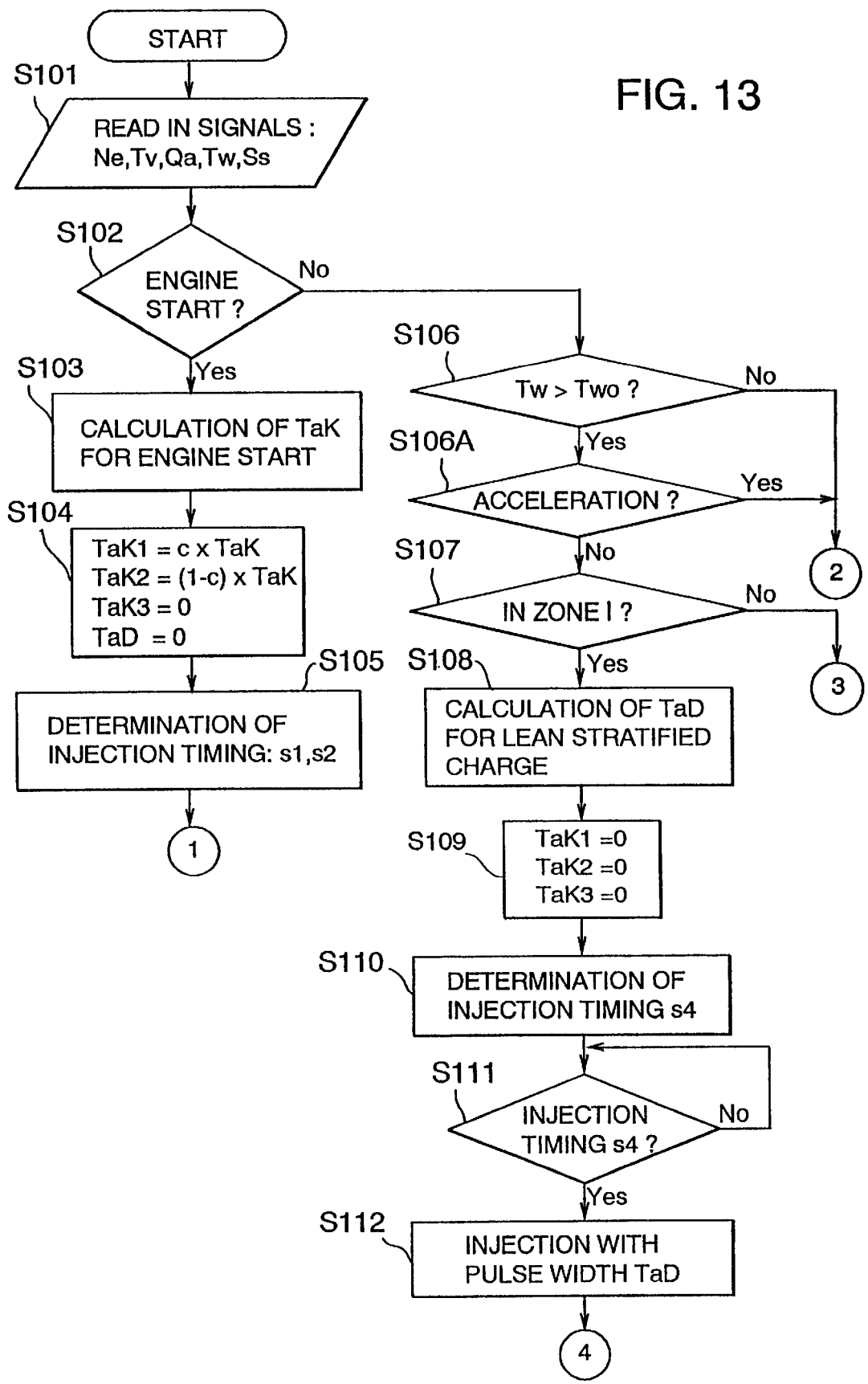
FIG. 13 is a flow chart illustrating a part of a sequence routine of fuel injection control in accordance with another embodiment.
Figure 14:
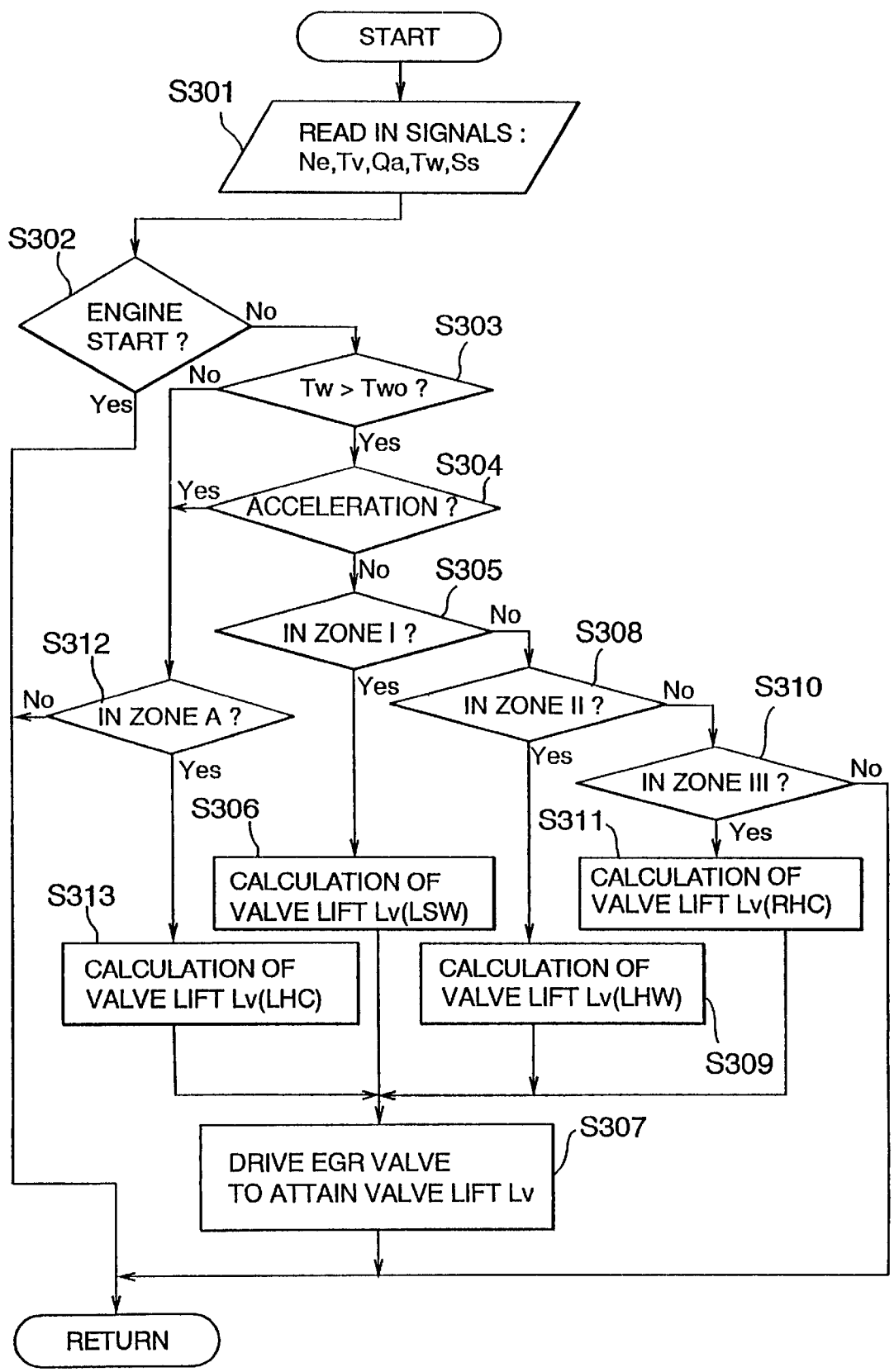
FIG. 14 is a flow chart illustrating a sequence routine of exhaust gas recirculation control of in accordance with the other embodiment.

FIGS. 13 and 14 show flow charts illustrating sequence routines of fuel charge control and exhaust gas recirculation control according to another embodiment of the invention, respectively.

Figure 5A:
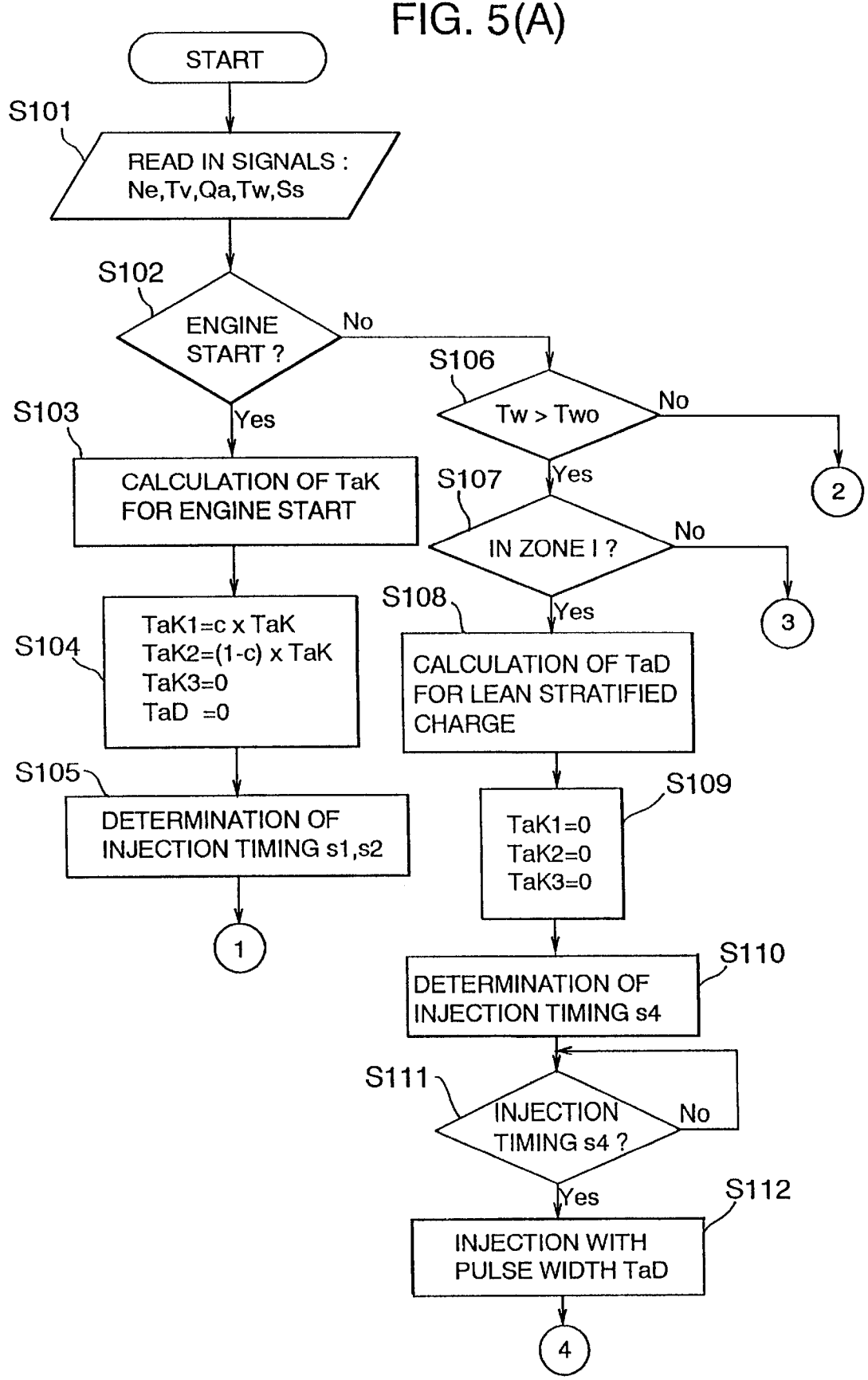
Figure 5B:
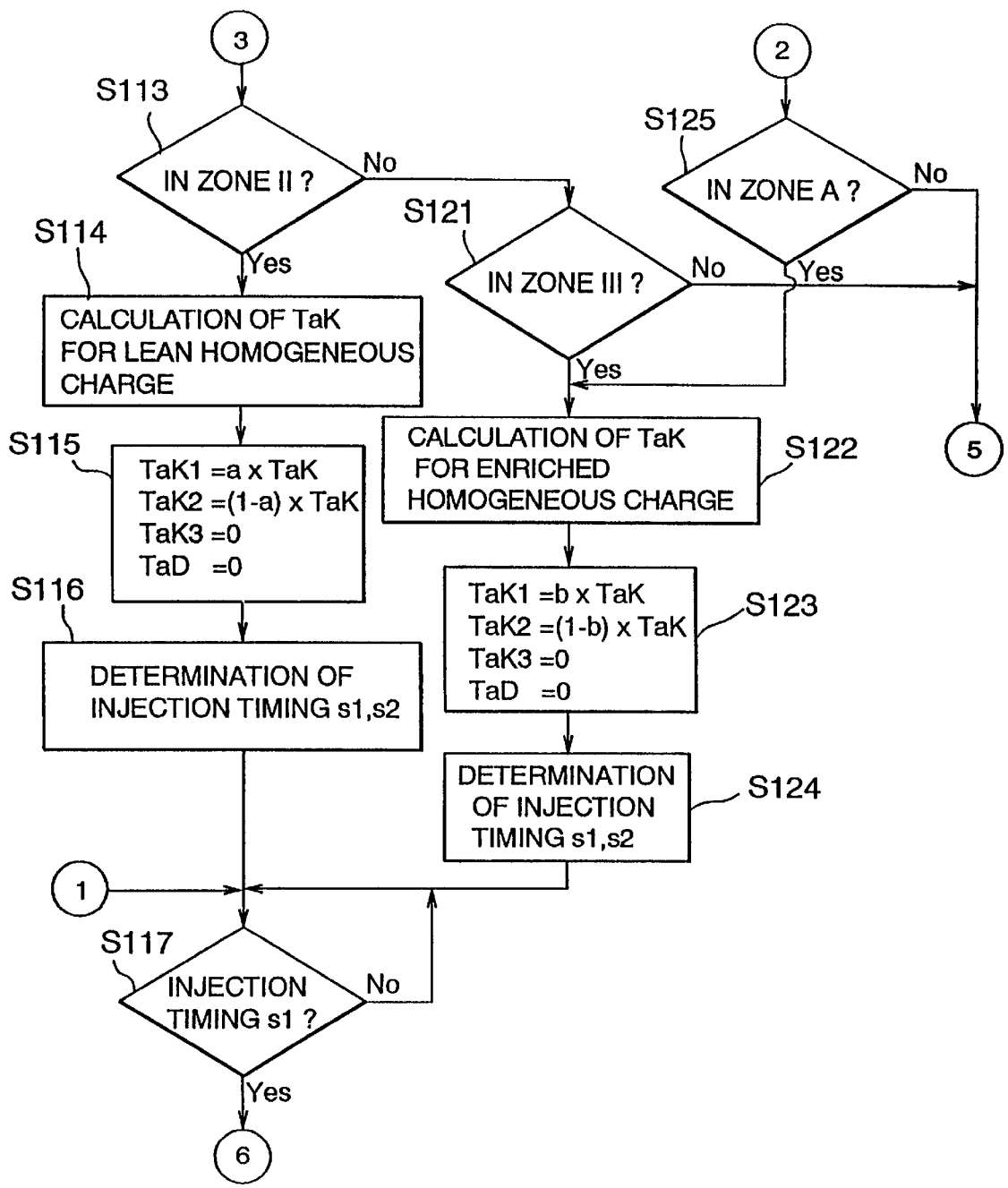

Referring to FIG. 13 showing the flow chart illustrating the fuel charge control sequence routine, the flow chart logic shown in FIG. 13 is similar to the flow chart logic shown in FIGS. 5(A) through 5(D) but incorporates a decision block at step S106A between the decision blocks at step S106 and S107. In this embodiment, the split injection is executed together with exhaust gas recirculation during acceleration as well as while the engine 1 operates in any one of the fuel charge zones (II), (III) and (A) in order to refresh the lean NOx conversion catalyst 34. Specifically, when the cooling water temperature Tw is higher than the specified value Two at step S106, this indicates that the engine 1 is in a warm condition, then a decision is made at step S106A as to whether the engine is under acceleration. When a specified accelerator position two or a specified engine speed Neo is detected, it is decided that the engine 1 is under acceleration. When the answer is negative, the control proceeds to steps S126 through S130 or steps S122 through S124 and S117 through S120 after the decision as to the enriched homogeneous charge zone (A) for middle to middle to higher engine loadings of the fuel charge control map for cold engine operation (see FIG. 3) made at step S125 as shown in FIG. 5(A). On the other hand, when the answer is negative, the control proceeds to steps S108 through S112 or steps S113 through S120 or steps S113, S121–S122 and S117 through S120 after the decision as to the lean stratified charge zone (I) for lower engine loadings and lower to middle engine speeds of the fuel charge control map for warm engine operation (see FIG. 2) made at step S107.

FIG. 14 shows a flow chart illustrating a sequence routine of exhaust gas recirculation control by controlling the EGR valve 39 according to another embodiment of the invention.

When the flow chart logic commences and control proceeds directly to a function block at step S301 where signals Ne, Tv, Qa, Tw, Lv and Ss representative of various control factors such as engine speed, accelerator position, intake air quantity, cooling water temperature, EGR valve lift and a starter signal, respectively, are read into the control unit 41. Subsequently, a decision is made at step S302 as to whether the engine 1 starts. When there is an occurrence of a starter signal Ss and the engine speed Ne is lower than a specified speed, an engine start is ascertained. When the answer is affirmative, the flow chart logic returns to restart the sequence routine. On the other hand, the answer to the decision is negative, another decision is made at step S303 as to whether the cooling water temperature Tw is higher than the specified value Two, i.e. whether the engine 1 is in a warm condition. When the answer is affirmative, then, a decision is subsequently made at step S304 as to whether the engine 1 is under acceleration. When a specified accelerator position Tvo or a specified engine speed Neo is detected, it is decided that the engine 1 is under acceleration. When the answer is negative, a decision is made at step S305 as to whether the engine operating condition is in the lean stratified charge zone (I) for lower engine loadings and lower to middle to higher engine speeds of the fuel charge control map for warm engine operation shown in FIG. 2. When the engine operating condition is in the lean stratified charge zone (I), a target valve lift Lv(LSW) of the EGR valve 39 for lean stratified charge combustion for warm engine operation is calculated at step S306. On the other hand, when the answer to the decision as to the lean stratified charge zone (I) made at step S305 is negative, a decision is made at step S308 as to whether the engine operating condition is in the lean homogeneous charge zone (II) for lower to middle engine loadings and lower to middle to higher engine speeds of the fuel charge control map for warm engine operation shown in FIG. 2. When the engine operating condition, i.e. the engine loading and speed, is in the lean homogeneous charge zone (II), a target valve lift Lv(LHW) of the EGR valve 39 for lean homogeneous charge combustion for warm engine operation is calculated at step S309. On the other hand, when the answer as to engine operating condition made at step S308 is negative, then, another decision is made at step S310 as to whether the engine operating condition is in the enriched homogeneous charge zone (III) for middle to higher engine loadings of the fuel charge control map for warm engine operation shown in FIG. 2. When the engine operating condition is in the enriched homogeneous charge zone (III), a target EGR valve lift Lv(RHW) of the EGR valve 39 for enriched homogeneous charge combustion for warm engine operation is calculated at step S311. Further, when the answer to the decision as to cooling water temperature Tw made at step S303 is negative or the answer to the decision as to acceleration made at step S304 is affirmative, another decision is made at step S312 as to whether the engine operating condition is in the enriched homogeneous charge zone (A) for middle to higher engine loadings of the fuel charge control map for cold engine operation shown in FIG. 3. When the engine operating condition, i.e. the engine loading and speed, is in the enriched homogeneous charge zone (A), a target EGR valve lift Lv(LHC) of the EGR valve 39 for lean homogeneous charge combustion for cold engine operation is calculated at step S313. After calculation of a target valve lift Lv(LSW), Lv(LHW), Lv(RHW) or Lv(LHC) at step S306, S309, S311 or S313, respectively, the EGR valve 39 is actuated to admit exhaust gas into an intake air stream according to the valve lift Lv(LSW), Lv(LHW), Lv(RHW) or Lv(LHC) at step S307. When the target valve lift Lv(LSW), Lv(LHW), Lv(RHW) or Lv(LHC) is attained, the flow chart logic returns to restart the sequence routine. Further, when the answer to the decision made at step S302 is affirmative or when the answer to any one of the decisions made at steps S310 and S312 is negative, the flow chart logic returns to restart the sequence routine without recirculating exhaust gas.

According to this embodiment, while the engine 1 is under in an accelerating condition where an air-fuel mixture is enriched, the lean NOx conversion catalyst 34 is expeditiously refreshed by executing the split injection and admitting a large amount of exhaust gas recirculation.

Figure 15:
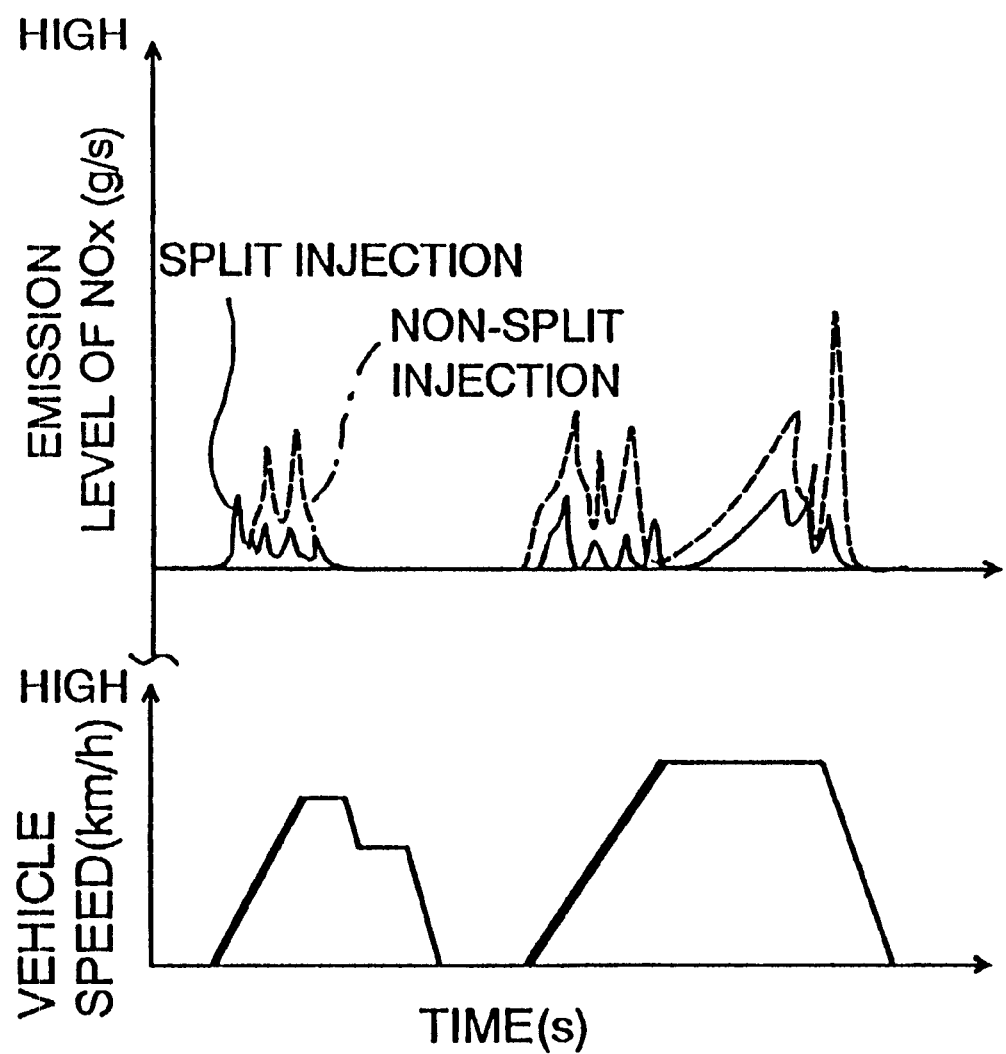
FIG. 15 is a graphical illustration showing the amount of formation of NOx relative to vehicle speed.

FIG. 15 shows the amount of NOx formation relative to vehicle speed as a result of actual running test of a vehicle on which the engine 1 equipped with the fuel charge control system of the embodiment shown in FIGS. 13 and 14 was mounted. In FIG. 15, the amount of NOx formation resulting from non-split injection together with exhaust gas recirculation control is shown by a solid line and the amount of NOx formation resulting from split injection is shown by a broken line. The vehicle used in the test was equipped with a double layered NOx conversion catalyst which has a NOx adsorption catalytic layer and a layer of catalyzing reduction of NOx in the exhaust line.

As shown in FIG. 15, it is proved that, while the vehicle is under acceleration as indicated by thick line section, the amount of NOx formation is significantly lower when a given amount of fuel is sprayed through early and late split injection is made together with recirculating a large amount of exhaust gas than when the given amount of fuel is sprayed all at once through non-split injection. This is because the split injection and exhaust gas recirculation extremely lowers the HC concentration of exhaust gas, and hence the HC concentration ratio (HC/NOx), as a result of which reduction of NOx is expeditiously accelerated. After second acceleration of the vehicle, the lean NOx conversion catalyst 34 experiences a rise in temperature accompanying a rise in exhaust gas temperature and causes a gradual decline in catalytic conversion efficiency, as a result of which the amount of NOx formation rises. Even in such an event, due to the refreshment of the lean NOx conversion catalyst 34 during the prior acceleration, the amount of NOx formation is controlled to be lower as compared to the case where fuel is sprayed through non-split injection. In this manner, when the engine 1 is operated with a enriched air-fuel mixture, the HC concentration ratio is greatly risen with an effect of refreshing the lean NOx conversion catalyst 34. As a result, the air-fuel ratio can be lowered by that extent during refreshing the lean NOx conversion catalyst 34. That is, when the engine 1 provides output satisfying an acceleration demand of the driver during acceleration as shown in FIG. 15, the air-fuel ratio may be altered to a stoichiometric ratio of 14.7 to prevent aggravation of specific fuel consumption and significantly reduces shocks on the driver without restricting a refreshing action on the lean NOx conversion catalyst 34. Even if there occurs a change in engine output due to an alteration of air-fuel ratio, there is no unpleasant shocks exerting on the driver because the change in engine output does not result from acceleration.

Figure 16A:
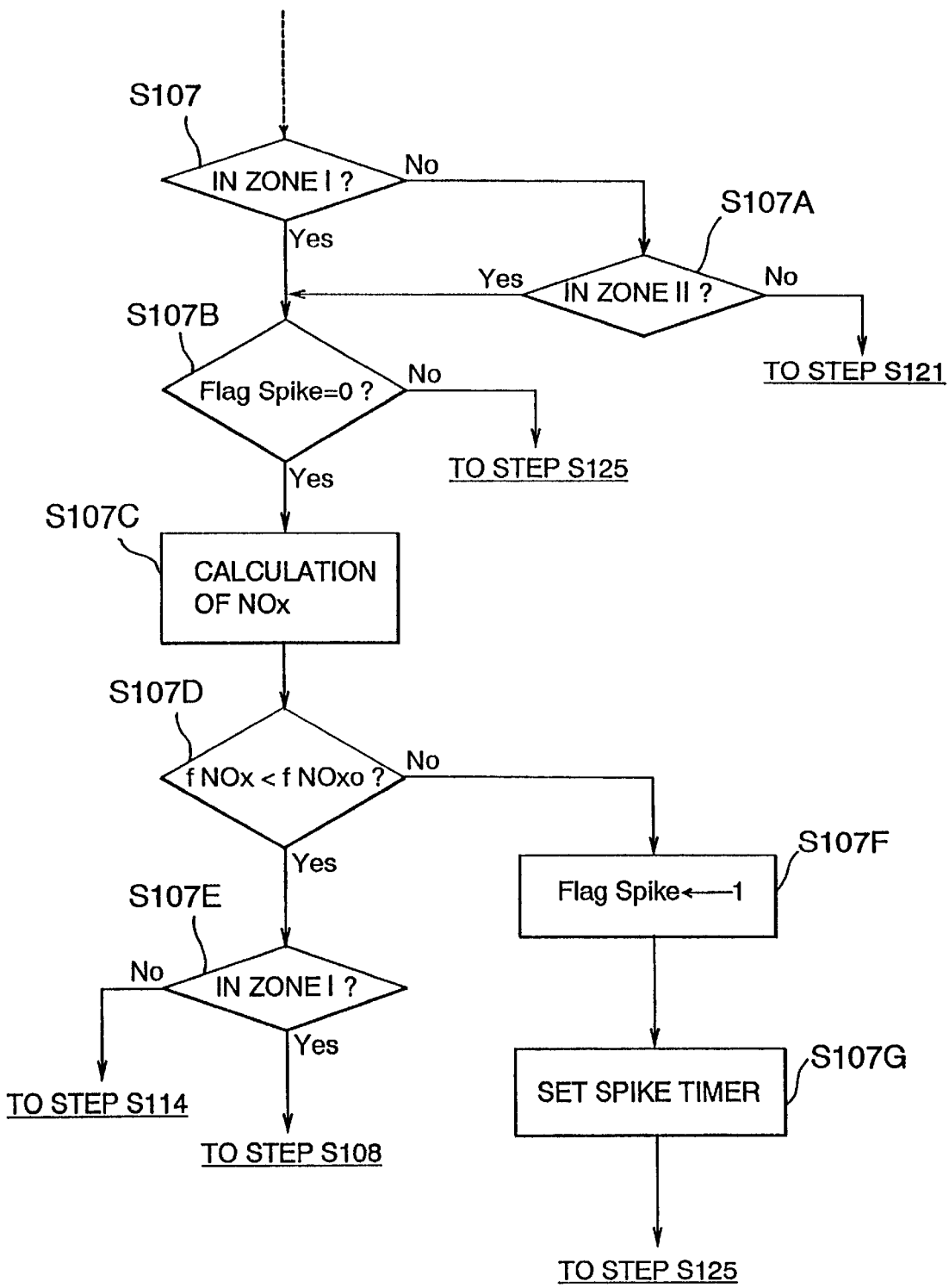
FIGS. 16(A) and 16(B) are a flow chart illustrating parts of a sequence routine of fuel injection control in accordance with a further embodiment.
Figure 16B:
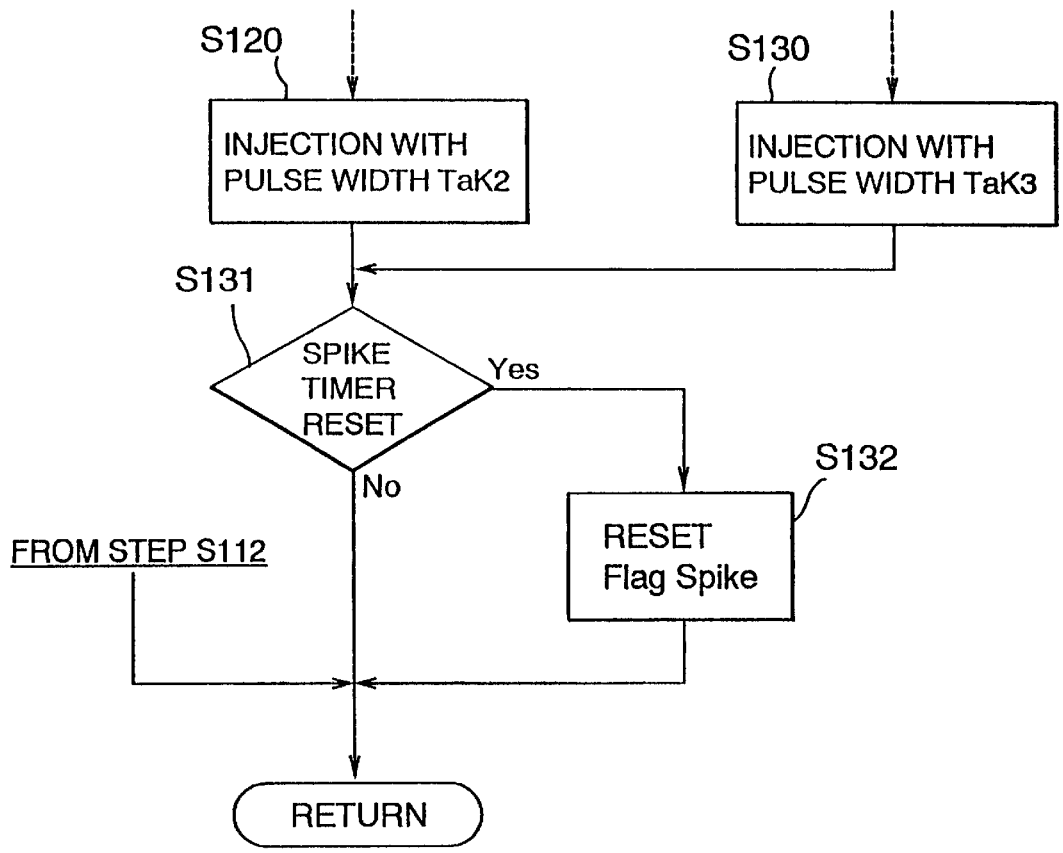
Figure 17:
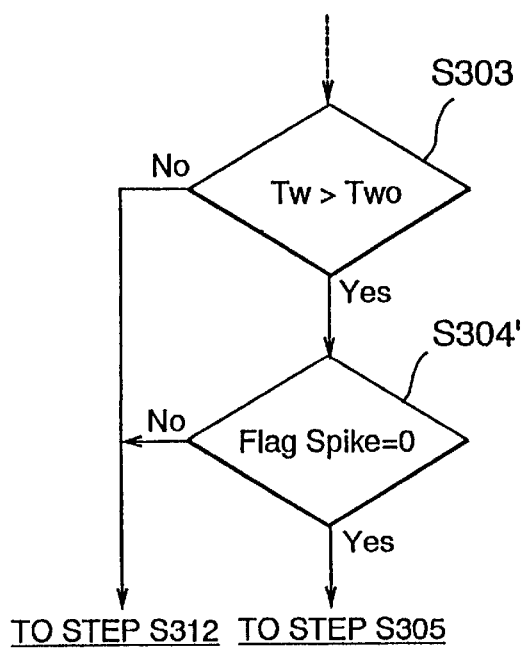
FIG. 17 is a flow chart illustrating a part of a sequence routine of exhaust gas recirculation control in accordance with the further embodiment.

FIGS. 16(A), 16(B) and 17 show flow charts illustrating sequence routines of fuel charge control and exhaust gas recirculation control according to another embodiment of the invention, respectively.

Referring to FIGS. 16(A) and 16(B) showing the flow chart illustrating the fuel charge control sequence routine, the flow chart logic is similar to the flow chart logic shown in FIGS. 5(A) through 5(D) or FIG. 13 but incorporates step S107A through S107G between the decision blocks at step S107 and S108 and steps S131 and S132 after the function blocks at steps S120 and S130. In this embodiment, the split injection is executed together with exhaust gas recirculation during acceleration as well as while the engine 1 operates in any one of the fuel charge zones (II), (III) and (A) in order to refresh the lean NOx reduction conversion catalyst 34 and the fuel charge with which the engine 1 is operated is forcibly enriched to prevent aggravation of catalytic conversion efficiency of the lean NOx conversion catalyst 34 when the amount of NOx adsorbed by the lean NOx conversion catalyst 34 increases due to engine operation with a lean stratified charge continuing for a specified period of time. Specifically, when the engine 1 operates in the lean stratified charge zone (I) at step S107 or in the lean homogeneous charge zone (II) at step S107A, a decision is made at step S107B as to whether an enriching flag FlagSpike has been down or reset to a state of "0." The enriching flag FlagSpike provides an indication of a demand for enriching a fuel charge when it is up or has been set to a state of "1" or an indication that there is no demand for enriching a fuel charge when it is down. When the enriching flag FlagSpike is up, the flow chart logic proceeds to the decision as to the enriched homogeneous charge zone (A) at step S125 (see FIG. 5(C)). On the other hand, when the enriching flag FlagSpike is down, a calculation is made at step S107C to estimate the amount of NOx (fNOx) adsorbed by the lean NOx conversion catalyst 34 based on engine operating condition and operating time. Subsequently, the estimated amount of adsorbed NOx (fNOx) is compared with a specified value (fNOxo) at step S107D. When the estimated amount of adsorbed NOx (fNOx) is less than the specified value (fNOxo), a decision is further made at step S107E as to whether the engine 1 operates in the lean stratified charge zone (I). When the answer is affirmative, the flow chart logic proceeds to the function block at step S108 (see FIG. 5(A)). On the other hand, when the answer is negative, the flow chart logic proceeds to the function block at step S114 (see FIG. 5(B)). Further, when the estimated amount of adsorbed NOx (fNOx) is greater than the specified value (fNOxo), the enriching flag FlagSpike is set to the state of "1" at step S107F, and a spike timer is set at step S107G. This spike timer is reset when counts up a specified time after a conclusion of enriching a fuel charge. When the enriching flag FlagSpike is down at step S107B or after setting the spike timer at step S107G, the flow chart logic proceeds to the function block for a decision as to the enriched homogeneous charge zone (A) at step S125 (see FIG. 5(B)).

As shown in FIG. 16(B), after execution of late split injection with a pulse width TaK2 at step S120 or non-split intake stroke injection with a pulse width TaK3 at step S130, a decision is made at step S131 as to whether the spike timer has been reset. Thereafter, the flow chart logic returns to restart the fuel charge control sequence routine when the spike timer has not yet reset or after resetting the enriching flag FlagSpike down at step S132 when the spike timer has reset.

As apparent from the description, that the amount of absorbed NOx is greater than the specified value represents continuous engine operation in a lean fuel change condition for the specified period of time. Further, the function of switching an engine operation in a lean fuel charge condition to an enriched fuel charge condition when the engine 1 is continuously operated with a lean fuel charge for a specific period of time and switching back to a lean fuel charge condition after a lapse of the specified period of time are implemented through steps S107B–107B and 131 and 132 of the flow chart show in FIGS. 16(A) and (B).

According to the fuel charge control, when it is decided that the estimated amount of NOx adsorption (fNOx) exceeds the specified value (fNOxo), the fuel charge is forcibly enriched to make the lean NOx conversion catalyst 34 refreshed and the split injection is continuously executed until the specified time passes. When the spike timer has counted the specified time and is reset, the fuel injection control is performed in the same sequence routine as illustrated by the flow chart shown in FIGS. 5(A) through 5(D).

Referring to FIG. 17 showing the flow chart illustrating the exhaust gas recirculation control sequence routine, the flow chart logic is similar to the flow chart logic shown in FIG. 13 excepting decision as to acceleration at step S303 with a decision as to enriching flag FlagSpike at step S303'.

In this embodiment, when the enriching flag FlagSpike is up, while the fuel charge is enriched and delivered through the split injection through steps S102–S107 and S113–S124 of the fuel charge control sequence routine, exhaust gas is recirculated to rise the HC concentration ratio (HC/NOx) thereof with an effect of expeditiously refreshing the lean NOx conversion catalyst 34.

Figure 18:
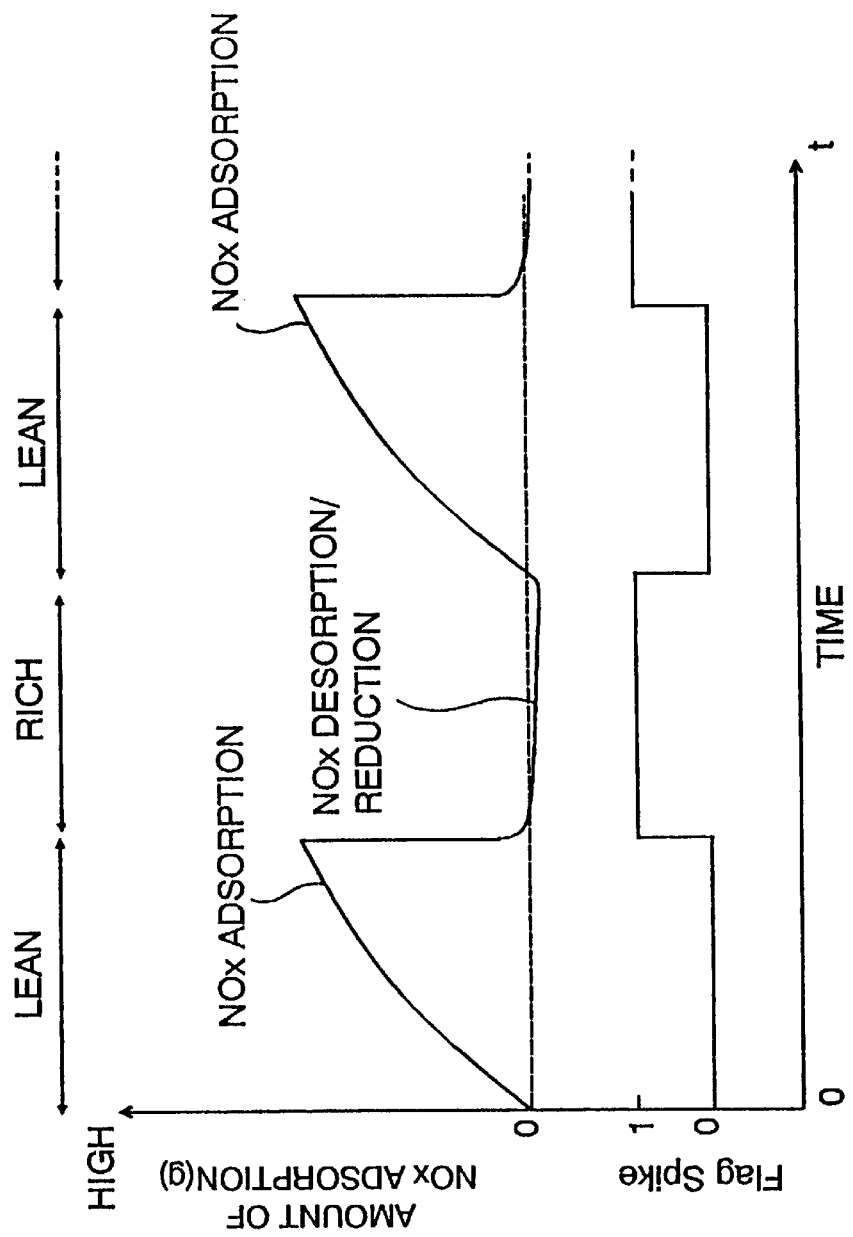
FIG. 18 is a time chart of a change in the amount of adsorbed NOx with respect to time progress.

As apparent from FIG. 18 showing the amount of NOx adsorption with respect progress of time, when the amount of NOx adsorption exceeds the critical value as a result of continuous engine operation with a lean stratified charge for a specified period of time, in order to prevent aggravation of the catalytic conversion efficiency of the lean NOx conversion catalyst 34 due to excessive NOx adsorption, the fuel charge is forcibly enriched to desorb nitrogen oxides NOx and catalyze reduction of NOx so as thereby to refresh the lean NOx conversion catalyst 34. Accordingly, even in the event where the engine 1 is continuously operated with a lean fuel charge, the lean NOx conversion catalyst 34 is prevented from causing aggravation of its catalytic conversion efficiency. When refreshing the lean NOx conversion catalyst 34, while fuel is delivered through the split injection, a large amount of exhaust gas is recirculated, so as to expeditiously refresh the lean NOx conversion catalyst 34. This is desirable to control the fuel charge to be rich but as low as a stoichiometric ratio and improve specific fuel consumption during refreshing the lean NOx conversion catalyst 34. When the lean NOx conversion catalyst 34 has been refreshed after a lapse of the specified period of time, the fuel charge is made lean again. As a result of this, the fuel consumption is improved during driving.

Figure 19:
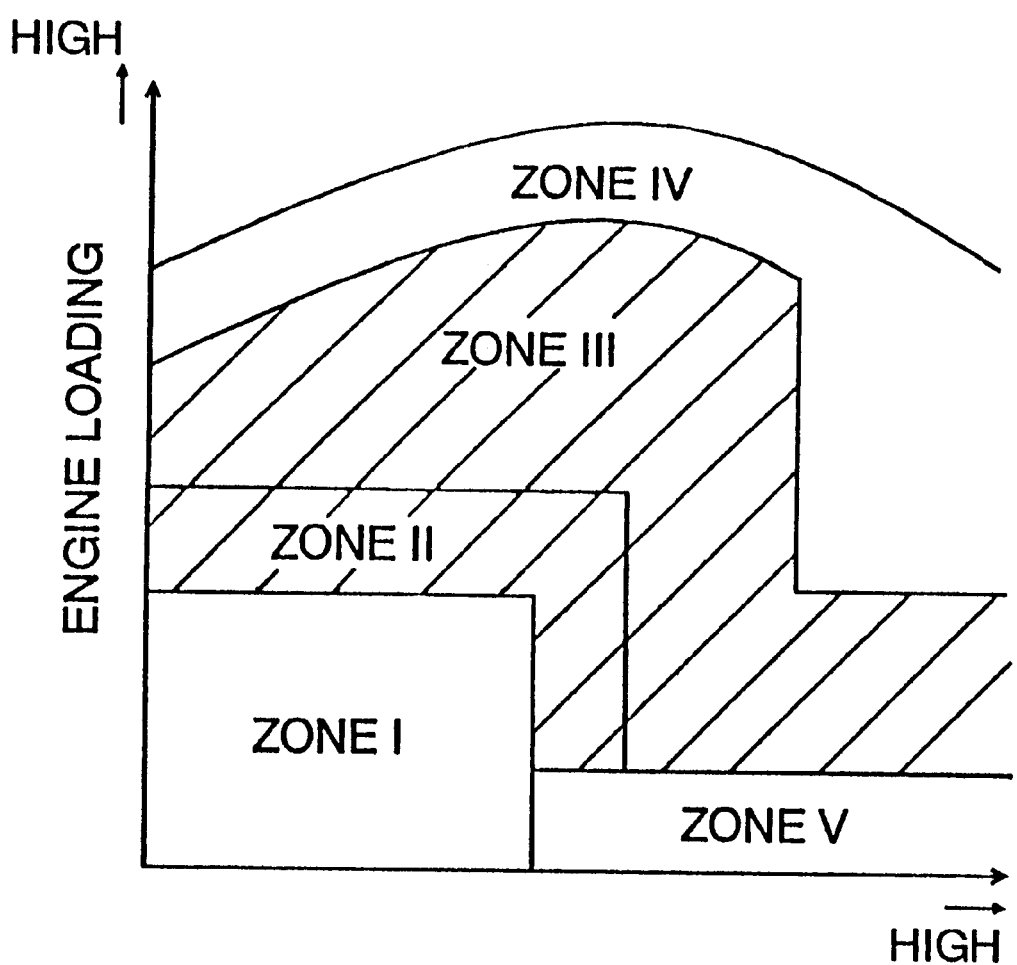
FIG. 19 is a diagram illustrating a variation of the map of fuel injection control zones for warm engine operation shown in FIG. 2.

FIG. 19 show a fuel charge control map for cold engine operation which is similar to that shown in FIG. 2 but has an enriched homogeneous charge zone (IV) is expanded above an enriched homogeneous charge zone (II). When using the fuel charge control map in the fuel charge control shown in FIGS. 5(A) through 5(D), the exhaust gas recirculation control is executed while the engine operates in the EGR zone shown in FIG. 14 which covers the lean stratified charge zone (I), the lean homogeneous charge zone (II) and the enriched homogeneous charge zone (III).

Figure 20:
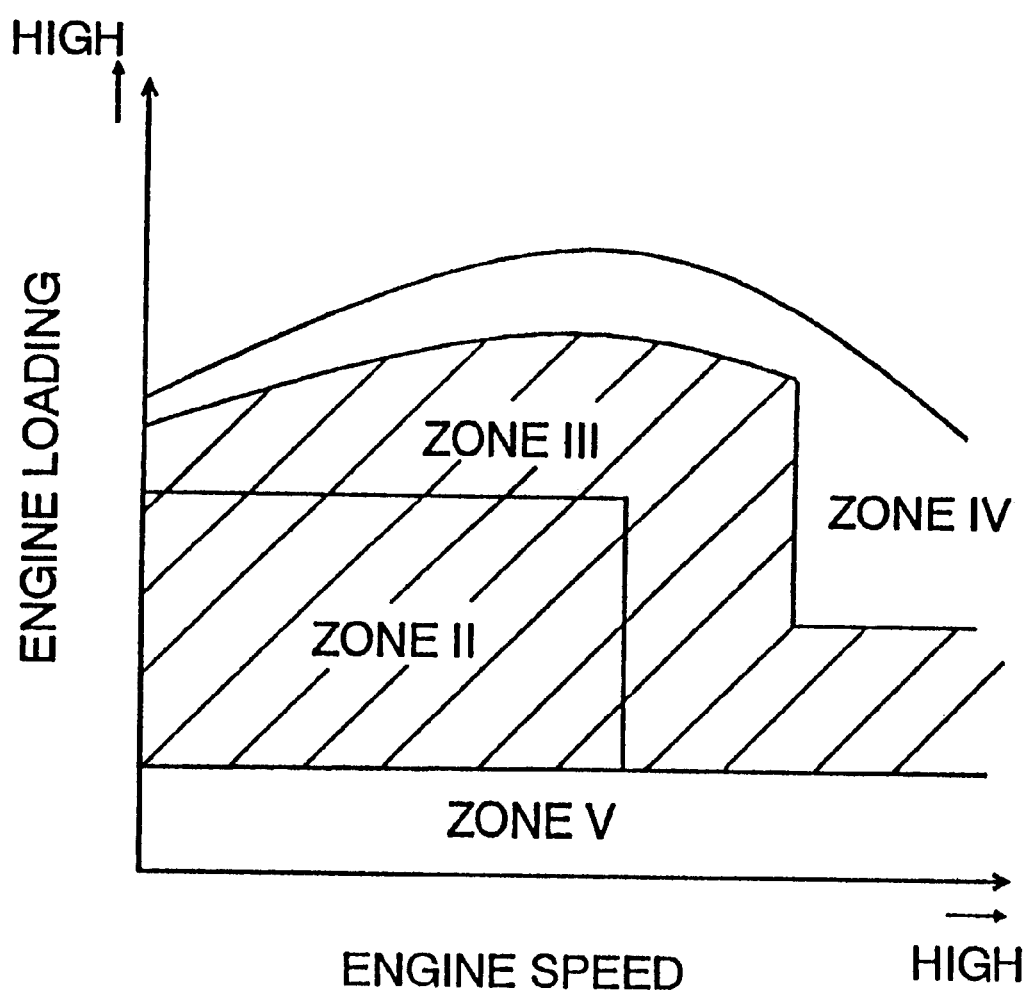
FIG. 20 is a diagram illustrating another variation of the map of fuel injection control zones for warm engine operation shown in FIG. 2.

FIG. 20 show a fuel charge control map for cold engine operation which is suitably used for fuel charge control of a direct injection-spark ignition engine of a type which does not have a stratified charge combustion feature. As shown in FIG. 20, the fuel charge control map is similar to that shown in FIG. 19 but, while having no lean stratified charge zone (I), defines an enriched homogeneous charge zone (V) lying over possible engine speeds in which non-split injection is executed. This type of direct injection-spark ignition engine has no necessity of having a piston formed with a top cavity and provides a reduction in heat loss consequently.

In any embodiment described above, in the fuel charge zones in which a fuel charge is made through split injection, a given amount of fuel may be divided into three parts or more. In such a case, it is desirable to start the last split injection at a point in a first division or a middle division of three divisional parts of a intake stroke. In view of refreshing the lean NOx conversion catalyst 34 by rising the HC concentration ratio (HC/NOx), it is not always necessary to execute split injection. That is, as shown in FIG. 10, the direct injection-spark ignition type engine operates with a more improved combustion stability even when charged through non-split injection than when charged through port injection. Consequently, exhaust gas cane be recirculated at a significantly high rate up to 20%. As a result, the HC concentration ratio (HC/NOx) of exhaust gas is sufficiently risen to refresh the lean NOx conversion catalyst 34 to some extent while the refreshing action is inferior to the above described embodiments. A decline in NOx concentration causes a rise in CO concentration ratio CO/NOx as well as a rise in HC concentration ratio (HC/NOx), providing an even more enhanced refreshing action on the lean NOx conversion catalyst. Further, a high HC concentration ratio (HC/NOx) of exhaust gas accelerates reduction of NOx, so to stabilize performance of a NOx reduction type catalyst as well as a NOx absorption type catalyst.

Although, in the embodiment shown in FIGS. 16(A), 16(B) and 17, the fuel charge is forcibly enriched to make the lean NOx conversion catalyst refreshed when the estimated amount of NOx adsorption (fNOx) exceeds the specified value (fNOxo), it may be enriched when the engine is continuously operated with a lean fuel charge, specifically in the lean stratified charge zone (I) or the lean homogeneous charge zone (II), for a specified period of time.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for a direct injection-spark ignition type of engine which is equipped with a fuel injector for spraying fuel directly into a combustion chamber, an intake system and an exhaust system having a lean NOx conversion catalyst for lowering an emission level of nitrogen oxides (NOx) in exhaust gas at an air-fuel ratio of $\lambda > 1$ for controlling the engine to operate with a fuel charge of $\lambda > 1$ in a zone of partial engine loadings and with a fuel charge of $\lambda < 1$ in an enriched charge zone other than said partial engine loading zone, said engine control system comprising:

engine operating condition monitoring means for monitoring engine operating conditions;

exhaust gas recirculation means for recirculating exhaust gas partly into said intake system from said exhaust system; and fuel injection control means for, while said engine operating condition monitoring means monitors engine operating conditions in said enriched charge zone, dividing a given amount of fuel into at least two parts which are delivered intermittently through early and late split injection in an intake stroke of said cylinder piston respectively and causing said exhaust gas recirculation means to recirculate exhaust gas into an intake air stream introduced into said intake system from said exhaust system while said fuel injector executes said early and late split injection.

2. The engine control system as defined in claim 1, wherein said injection control means divides a given amount of fuel into two parts which are delivered through early and late split injection respectively in an intake stroke of said cylinder piston, and controlling said fuel injector such that a midpoint between points of time at which said early and late split injection is timed to start before a midpoint of said intake stroke of said cylinder piston.

3. The engine control system as defined in claim 2, wherein said late split injection is timed to start at a point in one of first and middle divisions of three approximately equal divisions into which an intake stroke of said cylinder piston is divided.

4. The engine control system as defined in claim 3, wherein a midpoint of said late split injection is timed to be at a point before said midpoint of an intake stroke of said cylinder piston at which said cylinder piston attains a maximum down speed.

5. The engine control system as defined in claim 1, wherein said fuel injection control means controls said exhaust gas recirculation means to recirculate exhaust gas into said intake air stream with a ratio of an amount of recirculated exhaust gas to an amount of intake air higher than 20%.

6. The engine control system as defined in claim 1, wherein said fuel injection control means causes said fuel injector to execute said early and late split injection while said engine operating condition monitoring means monitors an accelerating condition.

7. The engine control system as defined in claim 1, wherein said fuel injection control means enriches a fuel charge when said engine is continuously operated with a lean fuel charge for a specified period of time and causes said fuel injector to execute said split injection while said engine is operated with said enriched fuel charge.

8. The engine control system as defined in claim 7, wherein said fuel injection control means changes said enriched fuel charge with a lean fuel charge after a lapse of a specified period of time since a fuel change is enriched.

9. The engine control system as defined in claim 1, wherein said fuel injection control means controls said fuel charge at approximately a stoichiometric air-fuel ratio in said enriched charge zone.

10. The engine control system as defined in claim 1, and further comprising air stream control means for creating an air stream in said combustion chamber.

11. The engine control system as defined in claim 1, wherein said fuel injector is of a type having a spray angle greater than approximately 45°.

12. The engine control system as defined in claim 1, wherein said fuel injection control means divides a given amount of fuel into two approximately equal parts for early and late split injection in an intake stroke of said cylinder piston.

13. An engine control system for a direct injection-spark ignition type of engine which is equipped with a fuel injector for spraying fuel directly into a combustion chamber, an intake system and an exhaust system having a lean NOx conversion catalyst for lowering an emission level of nitrogen oxides (NOx) in exhaust gas at an air-fuel ratio of $\lambda>1$ for controlling the engine to make stratified charge combustion in a zone of lower engine loadings and homogeneous charge combustion in a zone other than said partial engine loading zone, said engine control system comprising:

engine operating condition monitoring means for monitoring engine operating conditions;

exhaust gas recirculation means for recirculating exhaust gas partly into said intake system from said exhaust system; and fuel injection control means for, while said engine operating condition monitoring means monitors engine operating conditions in a zone where said engine operates with an enriched homogeneous fuel charge of $\lambda<1$, dividing a given amount of fuel into two parts which are intermittently delivered through early and late split injection respectively in an intake stroke of said cylinder piston, controlling said fuel injector such that a midpoint between points at which said early and late split injections are timed to start before a midpoint of said intake stroke of said cylinder piston, and causing said exhaust gas recirculation means to recirculate exhaust gas into an intake air stream introduced into said intake system from said exhaust system while said fuel injector executes said early and late split injection.

14. The engine control system as defined in claim 13, wherein said late split injection is timed to start at a point in one of first and middle divisions of three approximately equal divisions of an intake stroke of said cylinder piston.

15. The engine control system as defined in claim 13, wherein said fuel injection control means controls said exhaust gas recirculation means to recirculate exhaust gas into said intake air stream with a ratio of an amount of recirculated exhaust gas to an amount of intake air higher than 20%.

16. The engine control system as defined in claim 13, wherein said fuel injection control means causes said fuel injector to execute said early and late split injection while said engine operating condition monitoring means monitors an accelerating condition.

17. The engine control system as defined in claim 13, wherein said fuel injection control means enriches a fuel charge when said engine is continuously operated with a lean fuel charge for a specified period of time and causes said fuel injector to execute said split injection while said engine is operated with said enriched fuel charge.

18. The engine control system as defined in claim 13, wherein said fuel injection control means controls said fuel charge at approximately a stoichiometric air-fuel ratio in said enriched charge zone.

19. The engine control system as defined in claim 13, and further comprising air stream control means for creating an air stream in said combustion chamber.

20. The engine control system as defined in claim 13, wherein said fuel injector is of a type having a spray angle greater than approximately 45°.

21. The engine control system as defined in claim 13, wherein said fuel injection control means divides a given amount of fuel into two approximately equal parts for early and late split injection in a intake stroke of said cylinder piston.

22. An engine control system for a direct injection-spark ignition type of engine which is equipped with a fuel injector for spraying fuel directly into a combustion chamber, an intake system and an exhaust system having a lean NOx conversion catalyst for lowering an emission level of nitrogen oxides (NOx) in exhaust gas at an air-fuel ratio of $\lambda>1$ for controlling the engine to make stratified charge combustion in a zone of partial engine loadings and homogeneous charge combustion in a zone other than said partial engine loading zone, said engine control system comprising:

engine operating condition monitoring means for monitoring engine operating conditions;

exhaust gas recirculation means for recirculating exhaust gas partly into said intake system from said exhaust system; and fuel injection control means for, while said engine operating condition monitoring means monitors engine operating conditions in a zone where said engine operates with an enriched homogeneous fuel charge of $\lambda<1$, causing said exhaust gas recirculation means to recirculate exhaust gas into an intake air stream introduced into said intake system from said exhaust system so as to raise at least one of a ratio of hydrocarbon concentration to nitrogen oxides concentration ((HC/NOx)) of exhaust gas and a ratio of carbon monoxide concentration to nitrogen oxides concentration (CO/NOx) of exhaust gas.

23. An engine control system for a direct injection-spark ignition type of engine which is equipped with a fuel injector for spraying fuel directly into a combustion chamber, an intake system and an exhaust system having a lean NOx conversion catalyst for lowering an emission level of nitrogen oxides (NOx) in exhaust gas at an air-fuel ratio of $\lambda>1$ for controlling the engine to operate with a fuel charge of $\lambda>1$ in a zone of partial engine loadings and with a fuel charge of $\lambda<1$ in an enriched charge zone other than said partial engine loading zone, said engine control system comprising:

engine operating condition monitoring means for monitoring engine operating conditions;

exhaust gas recirculation means for recirculating exhaust gas partly into said intake system from said exhaust system; and fuel injection control means for, while said engine operating condition monitoring means monitors engine operating conditions in said enriched charge zone, causing said exhaust gas recirculation means to recirculate exhaust gas into an intake air stream introduced into said intake system from said exhaust system so as to raise at least one of a ratio of hydrocarbon concentration to nitrogen oxides concentration ((HC/NOx)) of exhaust gas and a ratio of carbon monoxide concentration to nitrogen oxides concentration (CO/NOx) of exhaust gas.

\* \* \* \* \*